United States Patent
Maron et al.

(10) Patent No.: US 11,260,399 B2
(45) Date of Patent: Mar. 1, 2022

(54) ASSESSING THE BENEFITS OF AUTOMATIC GRINDING CONTROL USING PST TECHNOLOGY FOR TRUE ON-LINE PARTICLE SIZE MEASUREMENT

(71) Applicant: CiDRA CORPORATE SERVICES INC., Wallingford, CT (US)

(72) Inventors: Robert J. Maron, Middletown, CT (US); Christian V. O'Keefe, Durham, CT (US); Jaime Sepulveda, Vitacura (CL)

(73) Assignee: CiDRA Corporate Services LLC, Wallingford, CT (US)

( * ) Notice: Subject to any disclaimer, the term of this patent is extended or adjusted under 35 U.S.C. 154(b) by 0 days.

(21) Appl. No.: 16/637,128

(22) PCT Filed: Aug. 7, 2018

(86) PCT No.: PCT/US2018/045623
§ 371 (c)(1),
(2) Date: Feb. 6, 2020

(87) PCT Pub. No.: WO2019/032593
PCT Pub. Date: Feb. 14, 2019

(65) Prior Publication Data
US 2020/0246806 A1 Aug. 6, 2020

Related U.S. Application Data

(60) Provisional application No. 62/617,714, filed on Jan. 16, 2018, provisional application No. 62/562,638, filed on Sep. 25, 2017, provisional application No. 62/542,021, filed on Aug. 7, 2017.

(51) Int. Cl.
*B03B 13/00* (2006.01)
*B02C 23/20* (2006.01)
(Continued)

(52) U.S. Cl.
CPC .............. *B03B 13/00* (2013.01); *B02C 23/20* (2013.01); *B02C 25/00* (2013.01); *B03B 5/34* (2013.01);
(Continued)

(58) Field of Classification Search
CPC ........... B03B 5/34; B03B 13/00; B02C 23/20; B02C 25/00; G01N 15/02; G01N 15/0255; G01N 2015/0053; B04C 11/00
See application file for complete search history.

(56) References Cited

U.S. PATENT DOCUMENTS 4,026,479 A * 5/1977 Bradburn ............ B02C 17/1805
241/30
5,161,694 A * 11/1992 Yoon ........................ B03B 1/04
209/165

(Continued)

FOREIGN PATENT DOCUMENTS

| WO | 2007133602 A2 | 11/2007 |
| WO | 2011019823 A1 | 2/2011 |
| WO | 2015031308 A2 | 3/2015 |

*Primary Examiner* — Joseph C Rodriguez
(74) *Attorney, Agent, or Firm* — Ware, Fressola, Maguire & Barber LLP

(57) ABSTRACT

A mineral extraction system features at least one hydrocyclone, each having input piping, underflow piping, a cyclone portion and overflow piping; a particle size measurement device arranged on some part of the at least one hydrocyclone and configured to sense particles flowing in a process medium, and providing signaling containing information about the size of the particles in the process medium; and a controller having a signal processor configured to receive the signaling, and determine control signaling to control some part of the mineral extraction system, based upon the signaling received.

23 Claims, 19 Drawing Sheets

CYCLONEtrac PST - Illustration of principle of operation

(51) Int. Cl.
*B02C 25/00* (2006.01)
*B03B 5/34* (2006.01)
*G01N 15/02* (2006.01)
*B04C 11/00* (2006.01)
*B03B 7/00* (2006.01)
*G01N 15/00* (2006.01)

(52) U.S. Cl.
CPC ............ *B03B 7/00* (2013.01); *B04C 11/00* (2013.01); *G01N 15/0255* (2013.01); *G01N 2015/0053* (2013.01); *G01N 2015/0261* (2013.01)

(56) References Cited

U.S. PATENT DOCUMENTS

| | | | | |
|---|---|---|---|---|
| 5,333,240 | A * | 7/1994 | Matsumoto | G06F 11/2257 |
| | | | | 706/20 |
| 6,143,183 | A | 11/2000 | Wardwell et al. | |
| 8,706,287 | B2 * | 4/2014 | Gocht | B02C 15/007 |
| | | | | 700/164 |
| 8,880,220 | B2 | 11/2014 | Salamanca | |
| 9,289,805 | B2 * | 3/2016 | Bagnoli | E21B 21/065 |
| 9,751,088 | B2 * | 9/2017 | Held | B02C 17/24 |
| 2012/0209550 | A1 * | 8/2012 | Van Der Spek | G01N 15/10 |
| | | | | 702/63 |
| 2015/0362418 | A1 | 12/2015 | Newton et al. | |
| 2016/0207050 | A1 | 7/2016 | Van Der Spek et al. | |
| 2017/0151573 | A1 * | 6/2017 | Coomer | B01D 21/267 |
| 2021/0023570 | A1 * | 1/2021 | Maron | B02C 25/00 |

\* cited by examiner

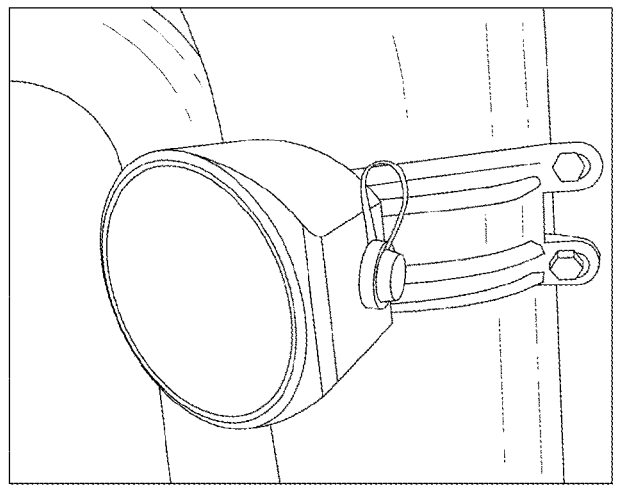
Figure 1: CYCLONEtrac PST particle sizing sensor mounted on hydrocyclone overflow pipe
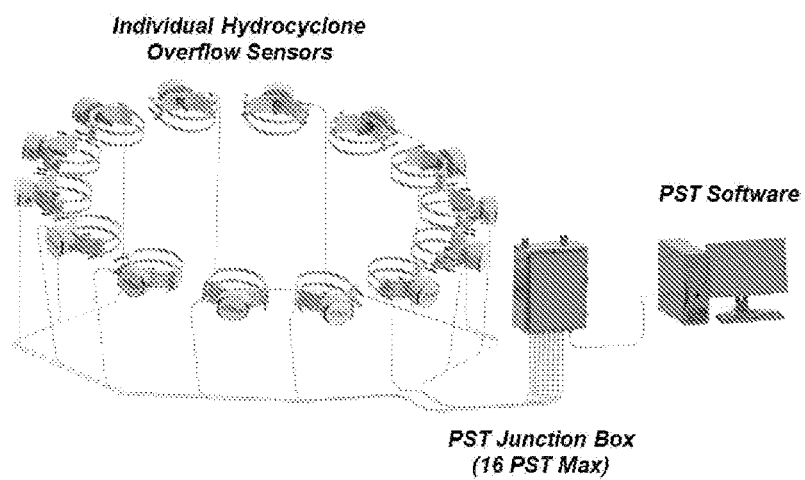
Figure 2: PST plant scale installation diagram

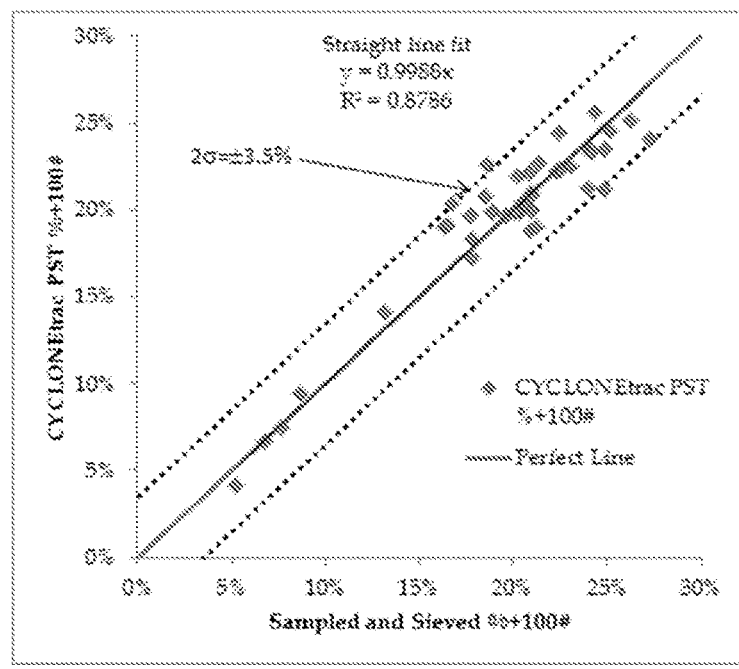
Figure 3: Example of PST results from single cyclone compared to sampled and sieved measurements
| INPUT DATA | | | | CALCULATED |
|---|---|---|---|---|
| Date | Std Deviation | Throughput (tph) | Feed Sizing (%+1) | Cyclone Feed (%+1) | tph +1 (tph) |
| 2-Jan | 16.8 | 2,775 | 0.69 | 82.1 | 15.7 |
| 3-Jan | 17.3 | 2,381 | 0.60 | 77.5 | 11.0 |
| 4-Jan | 20.7 | 2,864 | 0.57 | 79.0 | 12.8 |
Figure 4: Example, input data set and calculated output Figure 5: Example of data binning; non-binned points and average from binning Figure 6: Throughput vs Product Size, with and without data binning

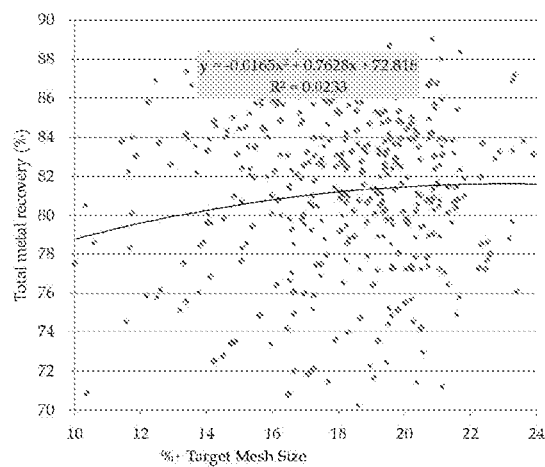 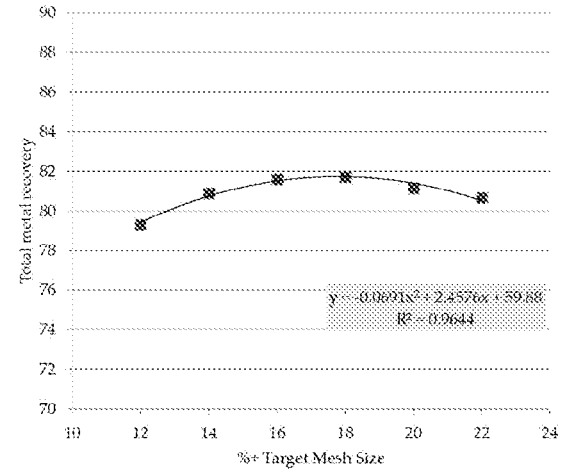
Fig. 7A  Fig. 7B
Figure 7: Recovery vs product size
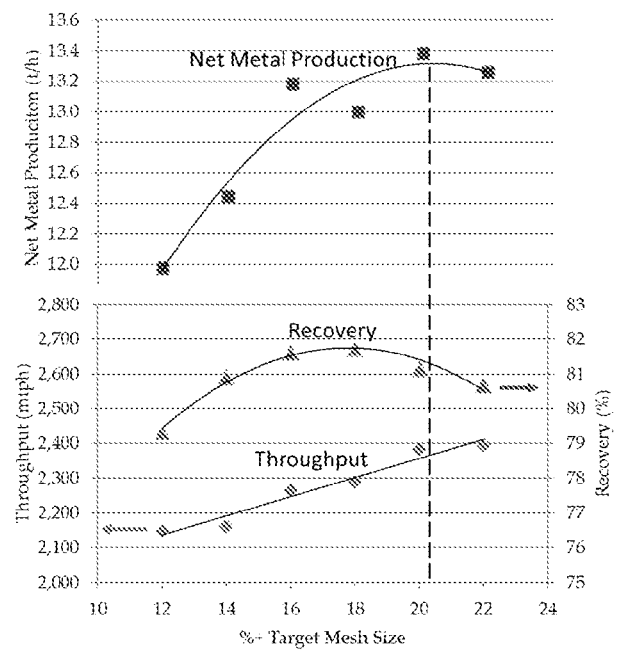
Figure 8: Net Metal Production (NMP) objective function (top) per Equation 1

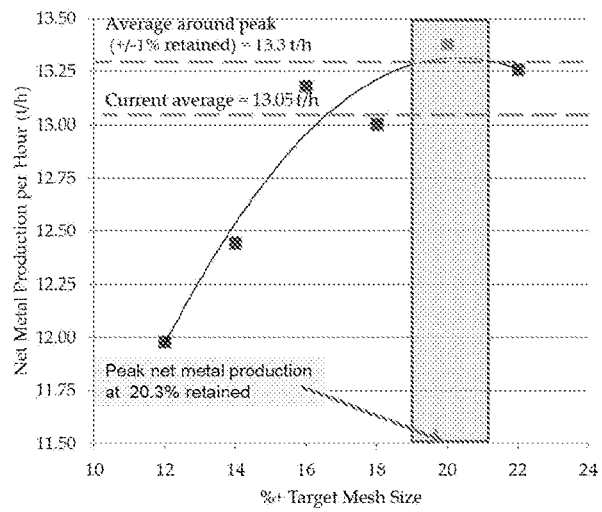
Figure 9: Net Metal Production optimized by operating at +/-1% of 20.3% +TMS
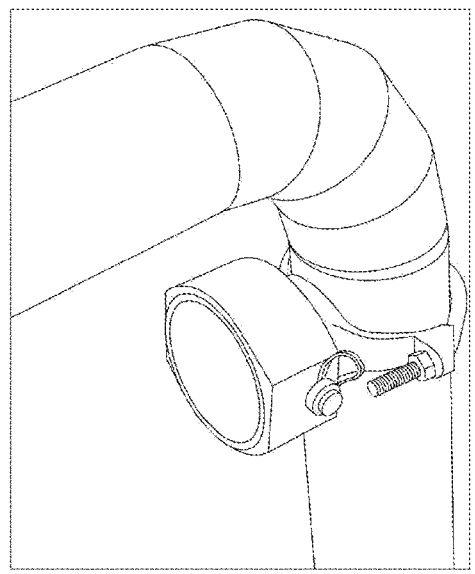
Fig. 10A
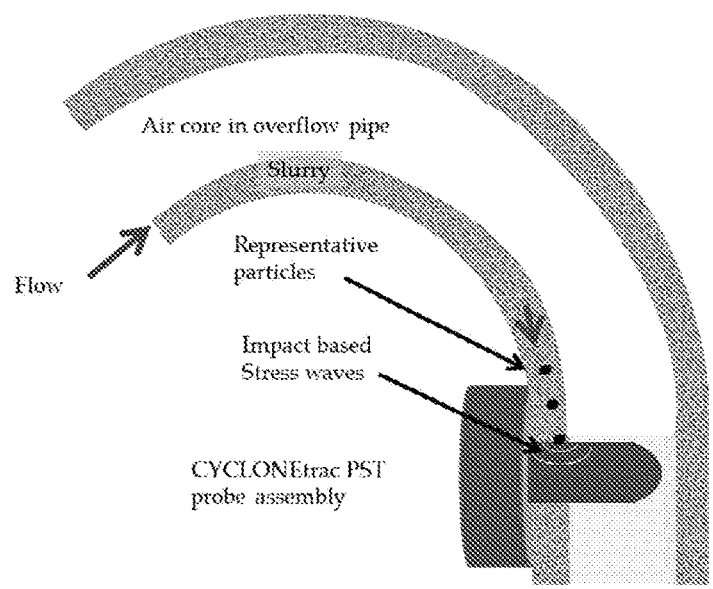
Fig. 10B
Figure 10: CYCLONEtrac PST - Installed on overflow pipe (Fig. 10A);
- Illustration of principle of operation (Fig. 10B).

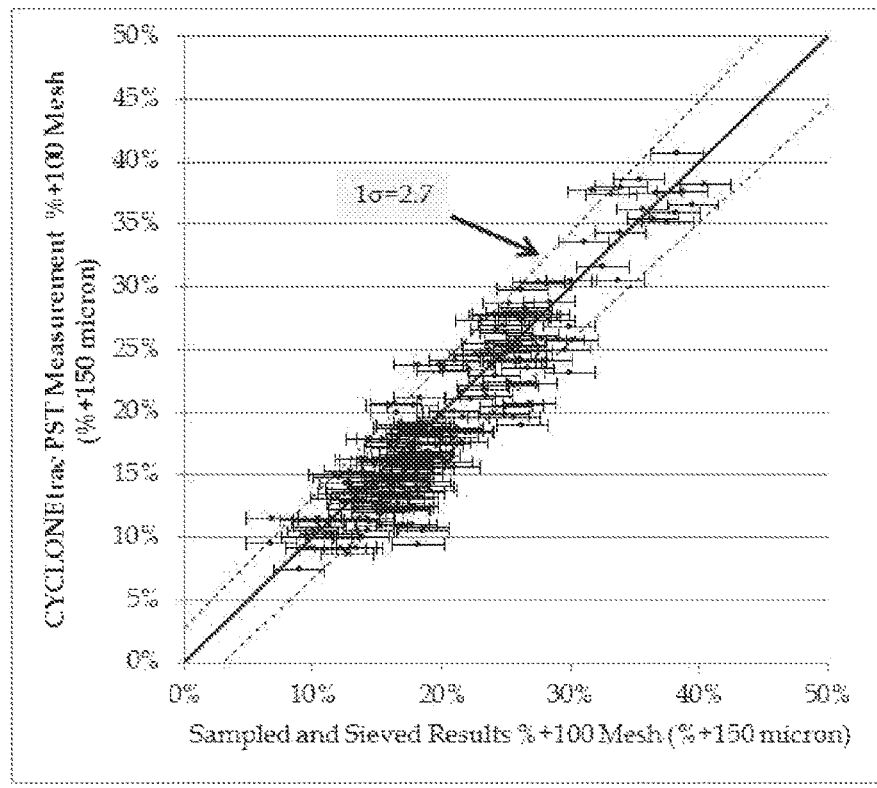
Figure 11: Comparison of CYCLONEtrac PST measurement with sampled and sieved data from major copper concentrator. (Dashed lines indicate calculated one standard deviation of 2.7.)

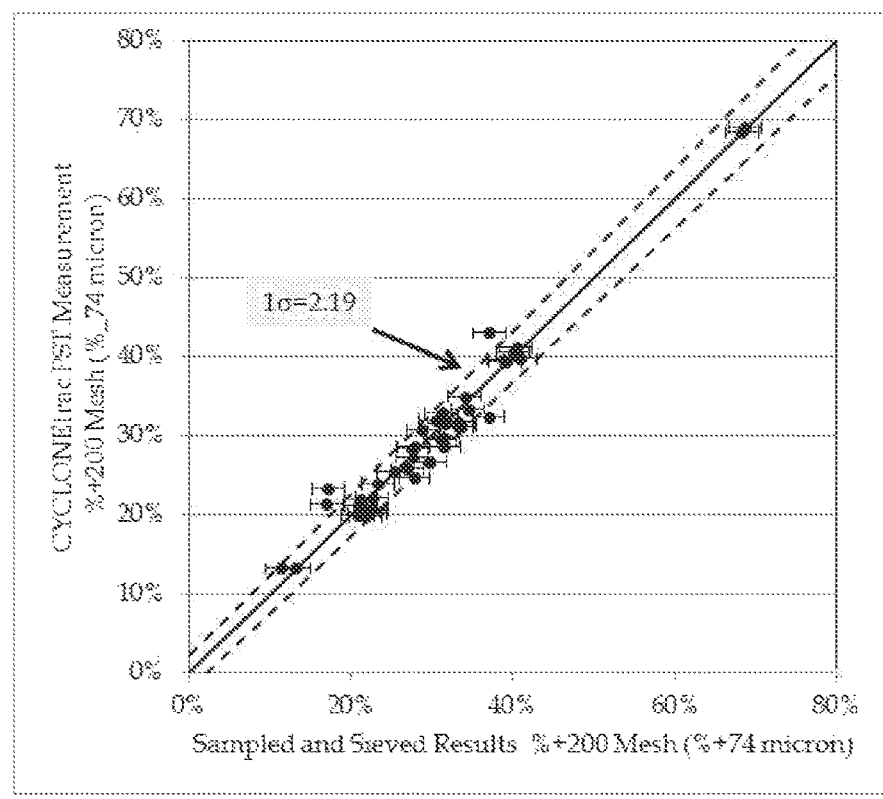
Figure 12: Comparison of CYCLONEtrac PST measurement with sampled and sieved data from copper, gold and silver concentrator. Dashed lines indicate calculated one standard deviation of 2.17.

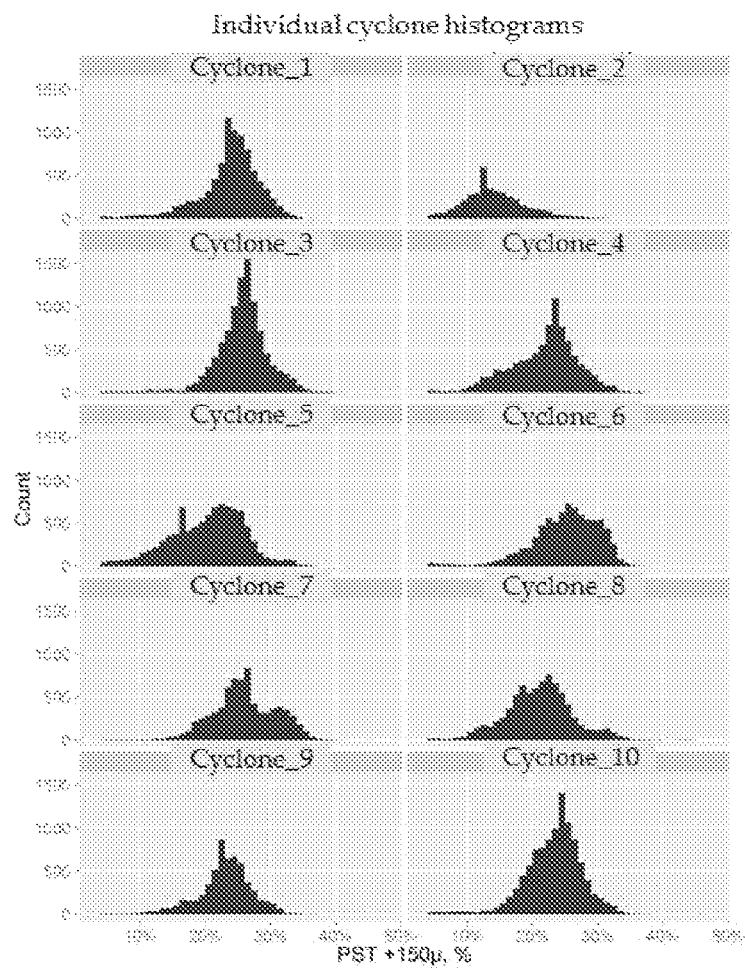
Figure 13: Histograms of particle sizes from the 10 cyclones on a battery over a one-month period.

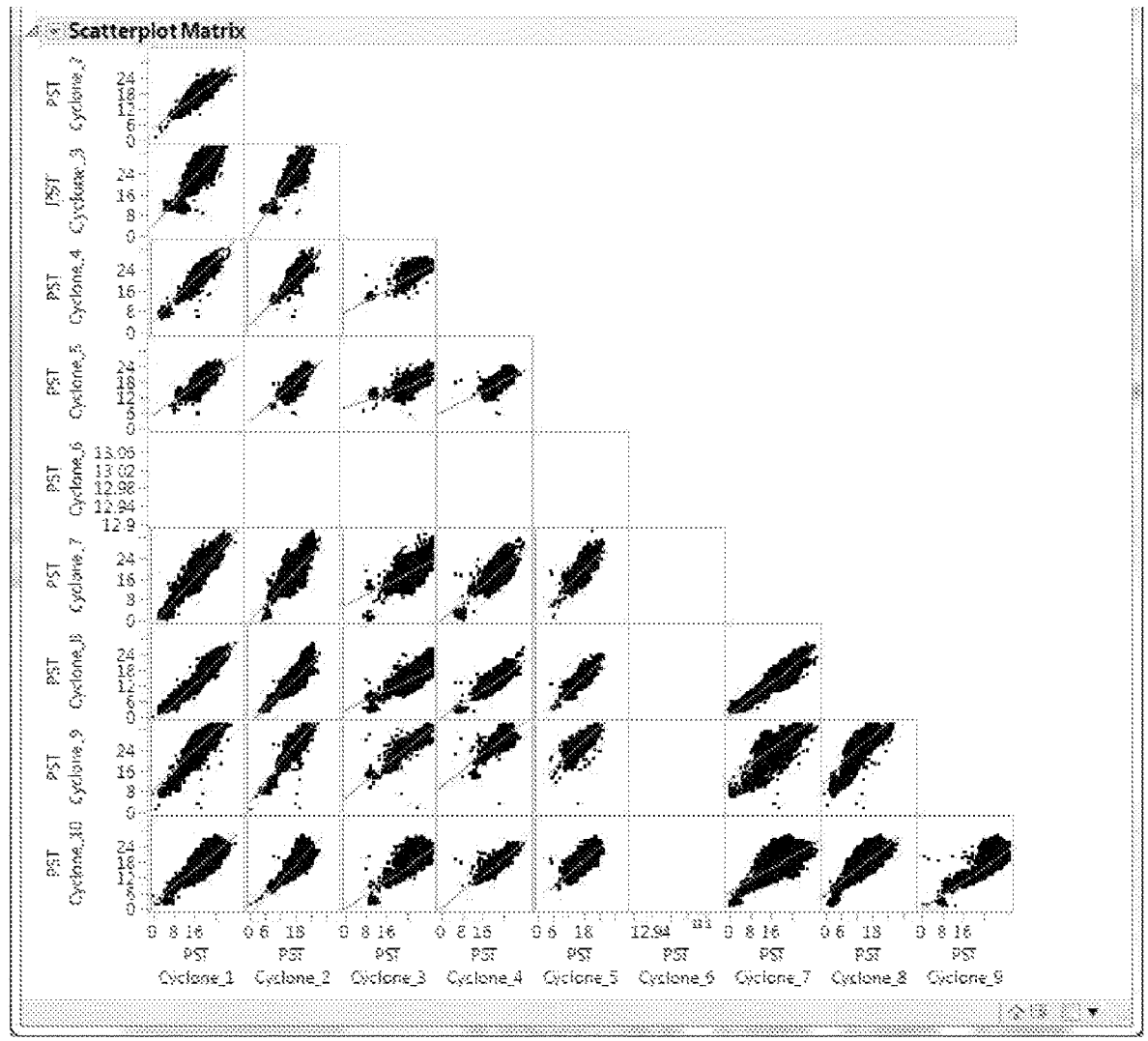
Figure 14: Scatterplots of particle size measurements from CYCLONETRAC PST on individual cyclones.

| Cyclone Number | \multicolumn{10}{c}{CYCLONEtrac PST Reading on Cyclone #} |

| Cyclone Number | 1 | 2 | 3 | 4 | 5 | 6 | 7 | 8 | 9 | 10 |
|---|---|---|---|---|---|---|---|---|---|---|
| 1 | 1.00 | 0.82 | 0.71 | 0.84 | 0.79 | 0.00 | 0.90 | 0.93 | 0.74 | 0.69 |
| 2 | 0.82 | 1.00 | 0.86 | 0.85 | 0.81 | 0.00 | 0.78 | 0.81 | 0.87 | 0.82 |
| 3 | 0.71 | 0.86 | 1.00 | 0.75 | 0.69 | 0.00 | 0.60 | 0.75 | 0.93 | 0.79 |
| 4 | 0.84 | 0.85 | 0.75 | 1.00 | 0.63 | 0.00 | 0.75 | 0.80 | 0.77 | 0.89 |
| 5 | 0.79 | 0.81 | 0.69 | 0.63 | 1.00 | 0.00 | 0.78 | 0.83 | 0.72 | 0.66 |
| 6 | 0.00 | 0.00 | 0.00 | 0.00 | 0.00 | 1.00 | 0.00 | 0.00 | 0.00 | 0.00 |
| 7 | 0.90 | 0.78 | 0.60 | 0.75 | 0.78 | 0.00 | 1.00 | 0.92 | 0.71 | 0.63 |
| 8 | 0.93 | 0.81 | 0.75 | 0.80 | 0.83 | 0.00 | 0.92 | 1.00 | 0.73 | 0.71 |
| 9 | 0.74 | 0.87 | 0.93 | 0.77 | 0.72 | 0.00 | 0.71 | 0.73 | 1.00 | 0.76 |
| 10 | 0.69 | 0.82 | 0.79 | 0.89 | 0.66 | 0.00 | 0.63 | 0.71 | 0.76 | 1.00 |

Figure 15: A Table 1 having correlation matrix with Pearson correlation coefficient indicating particle size correlations between cyclones on the same battery.

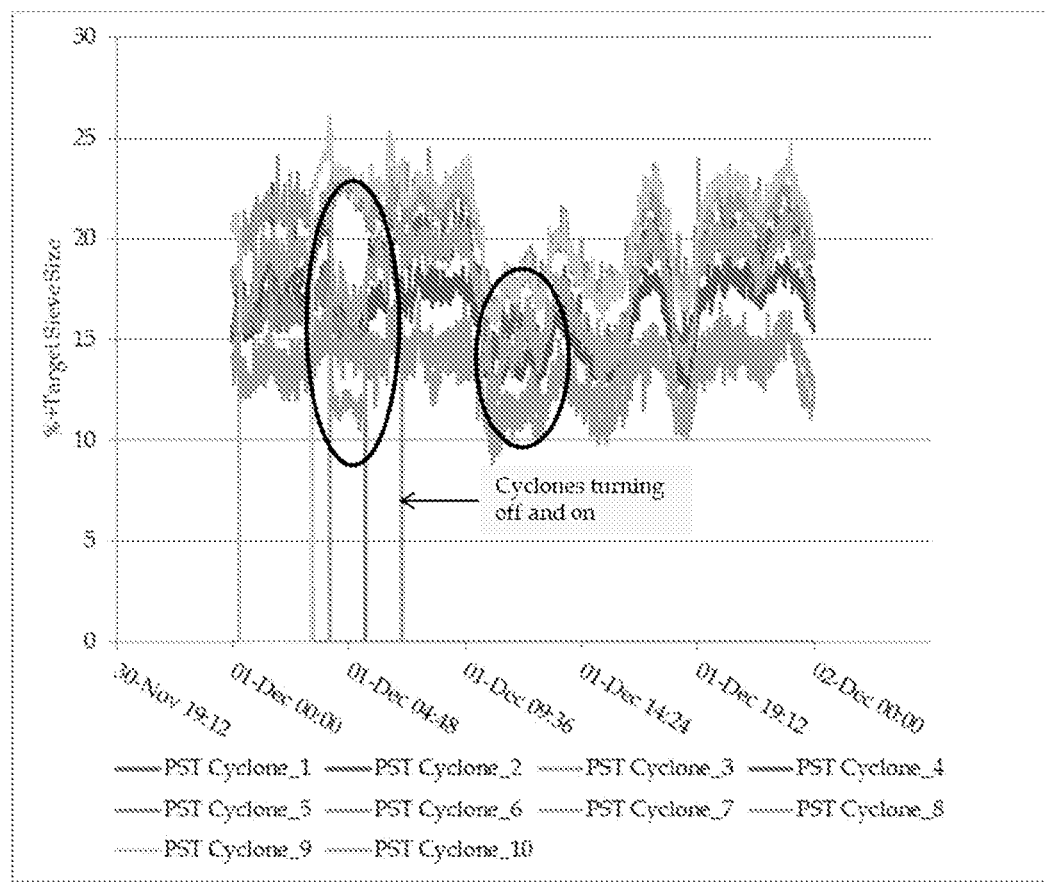
Figure 16: Time trace of particle size measurements on different cyclones on same battery indicating static and dynamic differences.

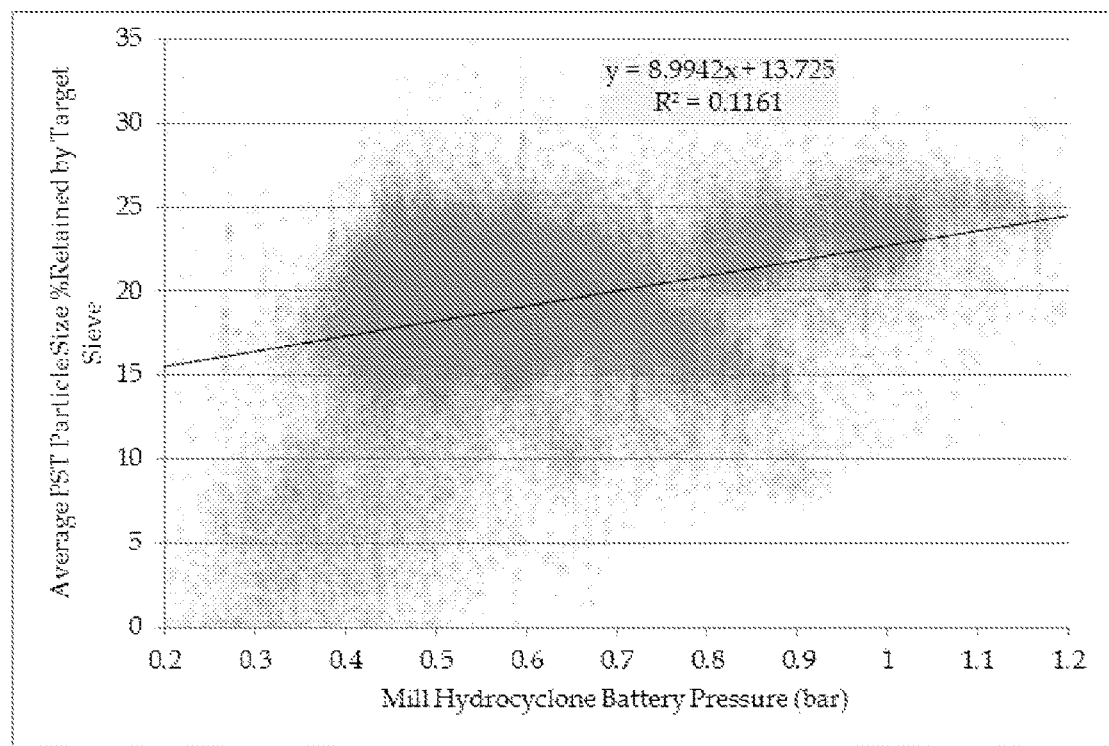
Figure 17: Cross plot of particle size as averaged from operating cyclones with cyclone battery pressure.

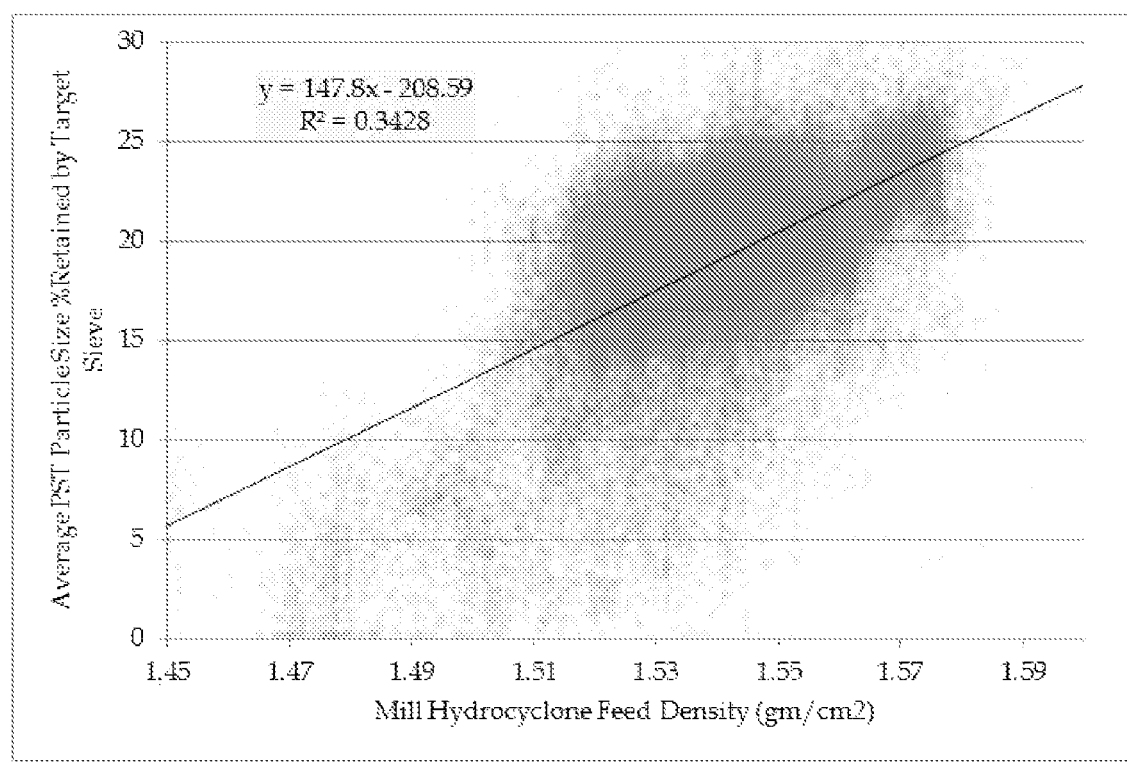
Figure 18: Cross plot of average cyclone overflow particle size versus cyclone battery feed density.

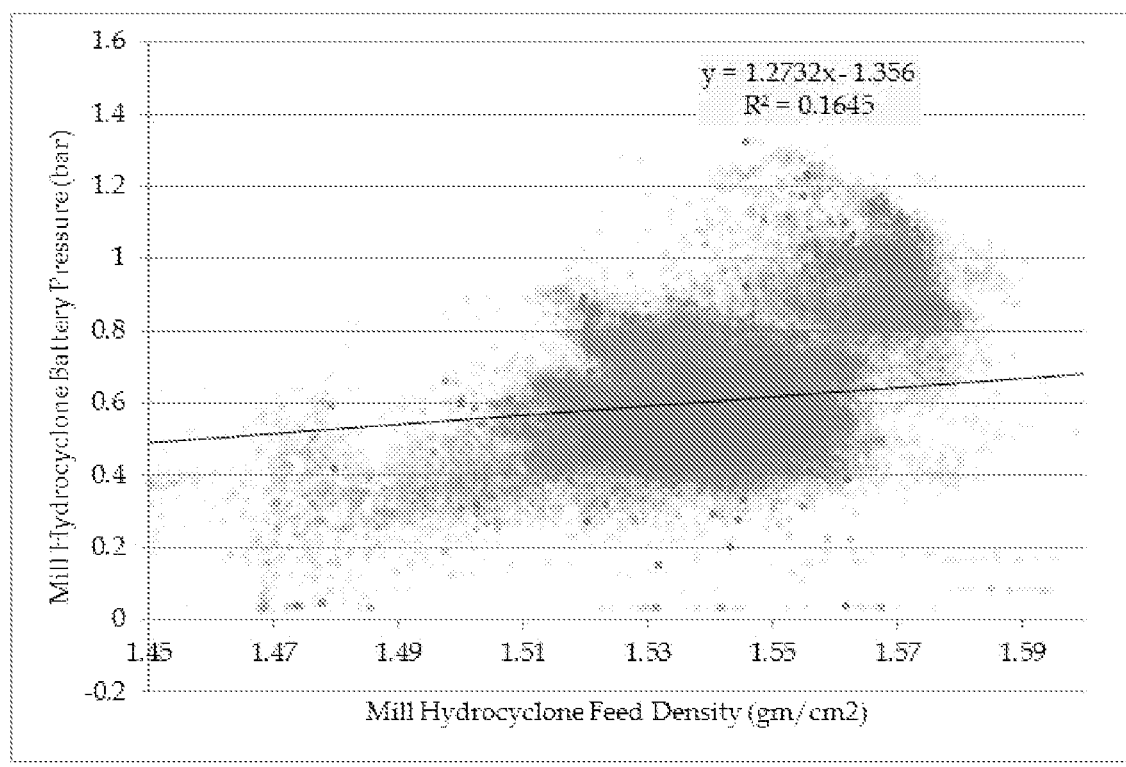
Figure 19: Cyclone pressure plotted with cyclone feed density.

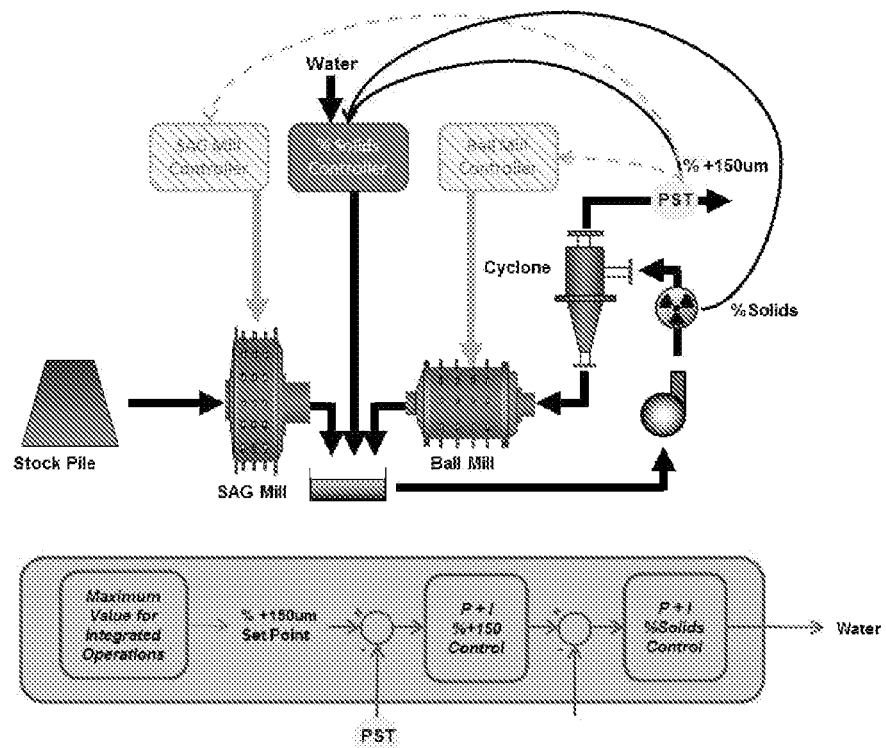
Figure 20: Example of battery level particle size control using CYCLONETRAC PST measurement.
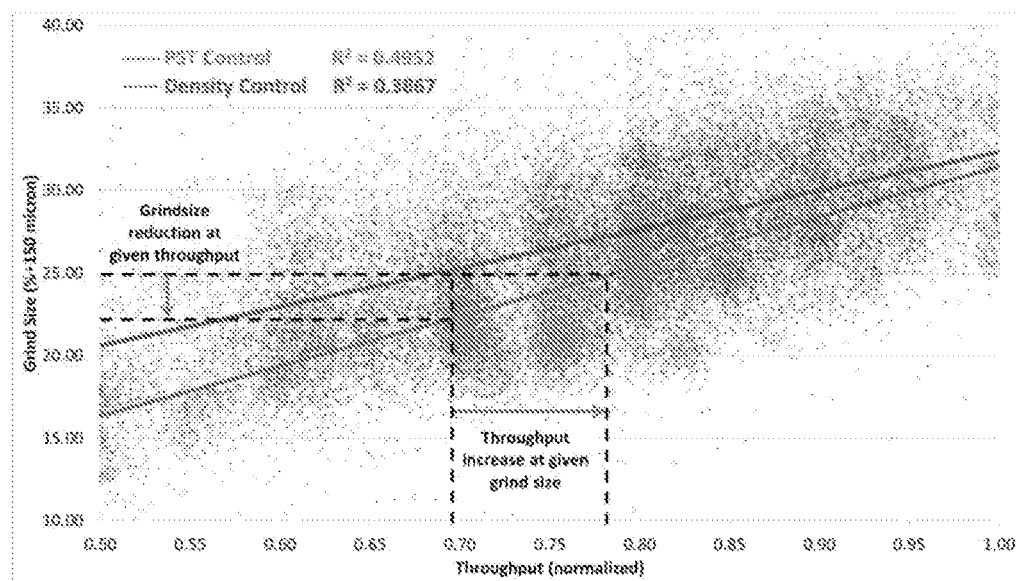
Figure 21: Impact of using control enabled by CYCLONETRAC PST measurement versus traditional density control.

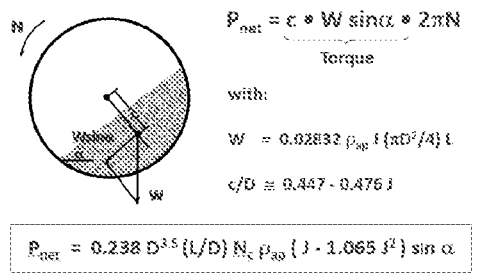
Figure 22: Hogg & Furstenau Model for Mill Power Draw
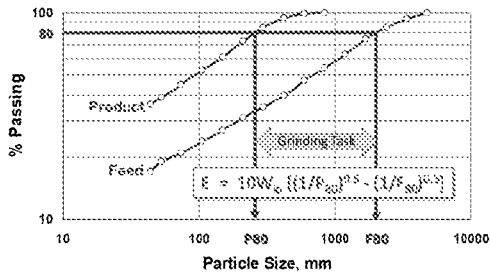 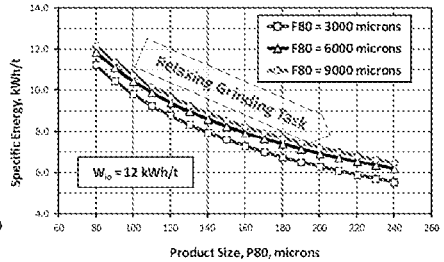
Fig. 23A  Fig. 23B
Figure 23: The 'Grinding Task' (Fig. 23A), and the effect of relaxing it (Fig. 23B)
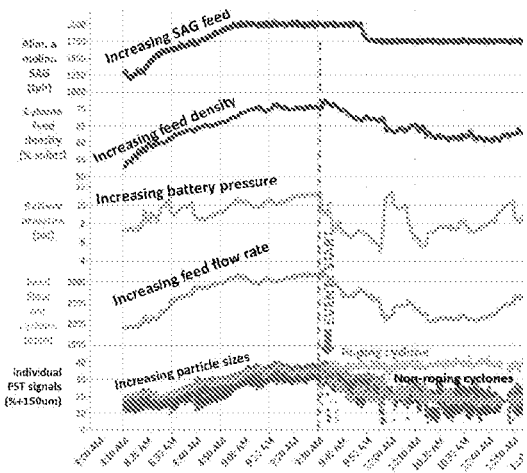
Figure 24: Hydrocyclone enters roping condition when process limit is exceeded Fig. 25A(1)　　　　　Fig. 25B(1)
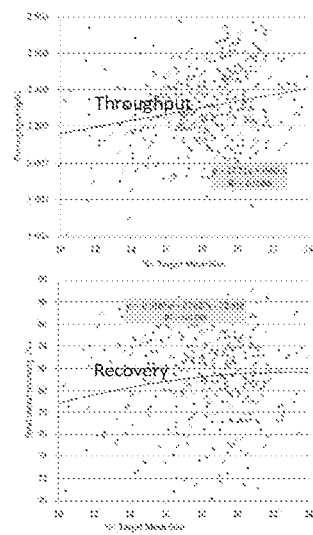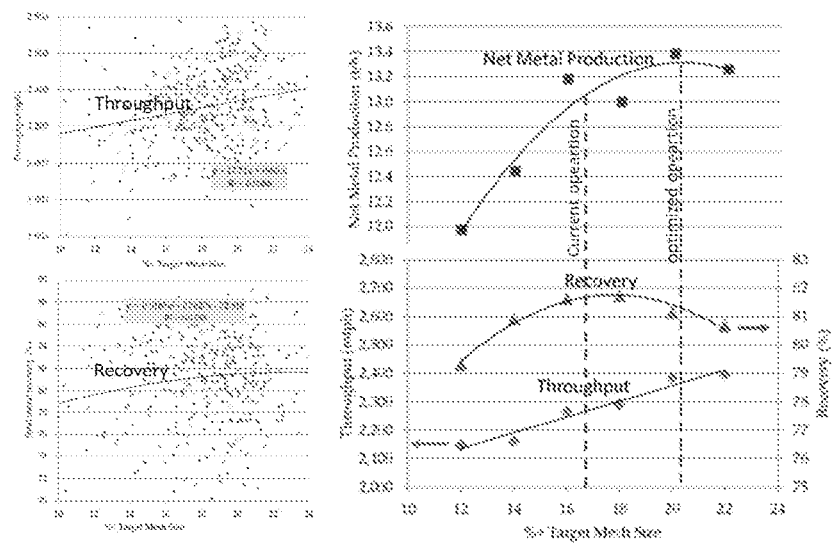
Fig. 25A(2)　　　　　Fig. 25B(2)
Figure 25: Throughput & Recovery unfiltered (left), with data binning (right) with Net Metal Production (NMP) objective function per Equation 1.
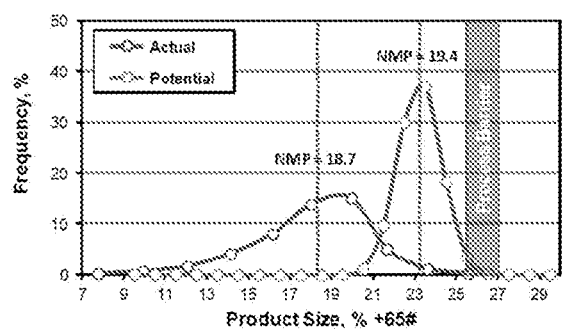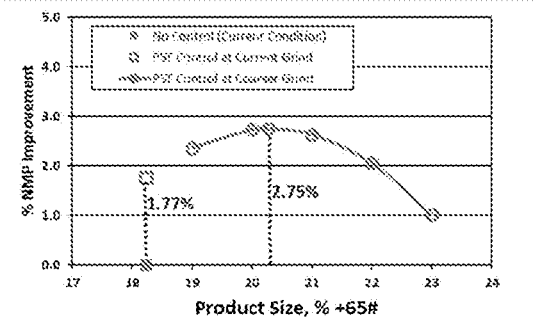
Fig. 26A　　　　　Fig. 26B
Figure 26: Actual and potential size distribution histograms and resultant NMPs (Fig. 26A), and associated potential percent NMP improvement (Fig. 26B).

Figure 27: Normalized product size distribution without real-time size control (Fig. 27A); normalized NMP improvement (Fig. 27B)

A mineral extraction system 10

> At least one hydrocyclone 12, each having input piping, underflow piping, a cyclone portion and overflow piping > A particle size measurement device 14 arranged on some part of the at least one hydrocyclone and configured to sense particles flowing in a process medium, and providing signaling containing information about the size of the particles in the process medium > A controller 16 having
>
>> A signal processor or processing module 16a configured at least to:
>>
>> receive the signaling;
>>
>> determine control signaling containing information to control some part of the mineral extraction system, based upon the signaling received; and/or
>>
>> provide the control signaling containing information to control some part of the mineral extraction system.
>
>> Other signal processor circuits or components 16b that do not form part of the underlying invention, e.g., including input/output modules, one or more memory modules, data, address and control busing architecture, etc.

Figure 28

ASSESSING THE BENEFITS OF AUTOMATIC GRINDING CONTROL USING PST TECHNOLOGY FOR TRUE ON-LINE PARTICLE SIZE MEASUREMENT

CROSS-REFERENCE TO RELATED APPLICATIONS

This application claims benefit to provisional patent application Ser. Nos. 62/542,021 (712-002.449/CCS-0199), filed 7 Aug. 2017; 62/562,638 (712-002.460/CCS-0202), filed 25 Sep. 2017; and 62/617,714 (712-002.462/CCS-0204), filed 16 Jan. 2018, which are all incorporated by reference in their entirety.

This application also relates to U.S. patent application Ser. No. 14/762,223, filed 21 Jul. 2015, claiming benefit to PCT/US2014/012510, filed 22 Jan. 2014, which claims benefit to application Ser. No. 61/755,305, filed 22 Jan. 2013, which corresponds to US 2015/0362418 A1, and which are all incorporated by reference in their entirety.

BACKGROUND OF THE INVENTION

1. Field of Invention

The present invention relates to techniques for controlling the operation of a mineral extraction system/process, e.g., based upon measuring a particle size in process fluid; such a slurry, using an acoustic impact-based approach.

2. Description of Related Art

Optimizing the metallurgical performance of an existing industrial-scale mineral processing plant as a function of grind product size is an important but often complex task. Changing the grind product size in the full-scale plant and observing the effects on flotation is a direct way, but the real effects can be masked by the multiple and unexpected disturbances common to grinding and flotation circuit operations (See McKay, 2014, referenced below). Simulators for both grinding and flotation have been developed and are very useful, but the integration of both can be complex, and they are still only models of the full-scale industrial plant and thus have inherent limitations (See Schwarz, S. 2013, referenced below). Methods have been developed using a series of laboratory tests conducted on industrial circuit samples that have also proven useful and gained acceptance (See Bazin, 1994, and Edwards, 1999, both referenced below.).

These three methods, and combinations of the above are certainly useful but involve considerable time and expense. In addition, they introduce uncertainty in the results due to the limitations of simulations, differences between plant and laboratory tests, and extrapolations from data taken from small sample sets and over small time frames. But often it is desirable to obtain an assessment of performance of an existing plant as a function of grind product size with less time and expense, and with more confidence that the results are representative of the industrial scale operation.

There is a need for a solution to this problem in the art.

SUMMARY OF THE INVENTION

Despite the recognized significance of ground product fineness on both line capacity and downstream process performance (typically flotation), less than 10% of mineral ore concentrators today use real-time particle size measurements in automatic control applications for the final product particle size.

Although "near-line" particle size measurement instrumentation has been in place for several decades and is commonly installed in most modern concentrators, its availability and low measurement frequency have typically been inadequate for reliable use in automatic control. Their low availability is often associated with problems with slurry sample collection and handling systems required to present the samples to the size measurement instrument.

Recently, an innovative technology for real-time, on-line particle size measurement has been developed by the assignee of the instant patent application, e.g., under its commercial name Particle Size Tracking (PST), already proven in several commercial installations, demonstrating near 100% availability with minimal maintenance, thus overcoming the limitations of previous technologies.

Investment decision makers require convincing, reliable estimates of the expected economic value that automatic grind control projects will deliver. This application presents a methodology for estimating such value from the installation of the new PST particle size measurement technology, capable of tracking particle size on each individual hydrocyclone overflow stream, thus adding significant new options for improved process stability and performance. Based on actual plant operating records, accumulated over long periods of time, the evaluation approach here described assesses and highlights the significant potential contribution to be expected from this unique PST technology.

Examples of Particular Embodiments

In particular, and according to some embodiments, the present invention may include, or take the form of, a mineral extraction system featuring:

at least one hydrocyclone, each having input piping, underflow piping, a cyclone portion and overflow piping;

a particle size measurement device arranged on some part of the at least one hydrocyclone and configured to sense particles flowing in a process medium, and providing signaling containing information about the size of the particles in the process medium; and a controller having a signal processor configured to receive the signaling, and determine control signaling to control some part of the mineral extraction system, based upon the signaling received.

According to some embodiment of the present invention, the signal processor module may be configured to provide control signaling containing information to control some part of the mineral extraction system.

The present invention may also include one or more of the following features:

The controller may be configured to provide the control signaling to control parts of the mineral extraction system.

The particle size measurement device may be arranged on the overflow piping of the at least one hydrocyclone.

The controller may include a % solids controller, and the signal processor may be configured to receive the signaling and determine the control signaling containing information to control the % solids provided to the input piping of the cyclone.

The control signaling may contain information to adjust water provide to the % solids.

The mineral extraction system may include a grinding mill configured to grind solid materials into ground particles; and the controller may include a grinding mill controller, and the signal processor is configured to receive the signaling and determine the control signaling containing information to control the grinding mill.

The control signaling may contain information to control a control parameter of the grinding mill, e.g., including power.

The grinding mill may include a SAG mill or a Ball mill.

The controller may be configured to operate the mineral extraction system at a set point, and the signal processor is configured to adjust the set point based upon the signaling received.

The signal processor may be configured to adjust the set point based upon a proportional/integral control algorithm.

The particle size measurement device may be an impact-based particle size measurement device.

The mineral extraction system may include a grinding mill configured to grind solid materials into ground particles having an average ground particle size; and the control signaling contains information to control the grinding mill to adjust the average ground particle size of the ground particles provided to the hydrocyclone, based upon the signaling received, including adjusting a set point of the mineral extraction system.

The controller may be configured to operate the mineral extraction system with a desired throughput; and the control signaling may contain information to control the desired throughput of the mineral extraction system, based upon the signaling received, including adjusting a set point of the mineral extraction system.

The controller may be configured to operate the mineral extraction system with a desired mineral recovery; and the control signaling may contain information to control the desired mineral recovery of the mineral extraction system, based upon the signaling received, including adjusting a set point of the mineral extraction system.

The mineral extraction system may include hydrocyclones having individual hydrocyclone sensors arranged thereon, each configured to sense respective particles flowing in a respective process medium in a respective hydrocyclone, and providing respective signaling containing information about the respective size of the respective particles in the respective process medium; and a particle measurement device junction box configured to receive the respective signaling and provide the respective signaling to the controller.

The mineral extraction system may include a grind circuit configured to receive ore particles having a mass flow rate; and the controller is configured to adjust the mass flow rate of the ore particles received by the grind circuit, based upon the signaling received, including adjusting a set point of the mineral extraction system.

The at least one hydrocyclone may be configured to receive a slurry having a density; and the controller may be configured to adjust the density of the slurry received by the at least one hydrocyclone, based upon the signaling received, including adjusting a set point of the mineral extraction system.

The at least one hydrocyclone may include a battery of hydrocyclone; and the controller may be configured to adjust the number of open hydrocyclones in the batter, based upon the signaling received, including closing one or more hydrocyclones that are passing particles whose size distribution exceeds a threshold.

The at least one hydrocyclone may include a battery of hydrocyclone configured to receive a slurry at a volumetric flow rate; and the controller may be configured to adjust the volumetric flow rate of the slurry, based upon the signaling received, including adjusting a set point of the mineral extraction system.

By way of example, the signal processor or signal processing module may be configured with at least one processor and at least one memory including computer program code, and the at least one memory and computer program code may be configured, with the at least one processor, to cause the apparatus at least to receive the signaling and determine the particle sizes of solids in the process fluid, based at least partly on the signaling received.

According to some embodiments, the present invention may include, or take the form of, featuring: a controller for controlling a mineral extraction system, the controller having a signal processor configured to receive signaling containing information about the size of particles in a process medium sensed by a particle size measurement device arranged on an overflow piping of at least one hydrocyclone forming part of the mineral extraction system, and determine control signaling to control some part of the mineral extraction system, based upon the signaling received.

The methodology presented herein uses typically available historical plant data over a long time period to assess the current performance, and predict the performance improvement that may be possible if automatic control of the grind product size is implemented by the addition of reliable on-line particle size measurement technology.

The Method

The present invention may also take the form of a method featuring steps for configuring at least one hydrocyclone with input piping, underflow piping, a cyclone portion and overflow piping; arranging and particle size measurement device a particle size measurement device on some part of the at least one hydrocyclone to sense particles flowing in a process medium, and providing signaling containing information about the size of the particles in the process medium; and receiving a controller having a signal processor the signaling, and determining control signaling to control some part of the mineral extraction system, based upon the signaling received.

The method may also include providing from the controller the control signaling to control parts of the mineral extraction system.

The method may also include arranging the particle size measurement device on the overflow piping of the at least one hydrocyclone.

The method may also include one or more of the features set forth herein, according to some embodiments of the present invention.

BRIEF DESCRIPTION OF THE DRAWING

The drawing includes FIGS. 1-28, which are not necessarily drawn to scale, as follows:

FIG. 1 is a photograph of a PST particle sizing sensor mounted on a hydrocyclone overflow pipe.

FIG. 2 is a diagram of a PST plant scale installation.

FIG. 3 is a graph of CYCLONEtrac PST %+100 #versus sampled and sieved %+100 #, as an example of PST results (diamonds) from a single cyclone compared to sampled and sieved measurements.

FIG. 4 is a table showing an example of an input data set and a respective calculated output for three different dates, e.g., including input data having size (%+mesh #), throughput (tph), feed grade (% Cu), recovery total (% Cu), and including a calculated output of Net Metal Production (NMP) (tph).

FIG. 5 is a graph of net metal production per hour (Mt/h) versus %+target mesh size (TMS), as an example of data binning (e.g., including Bin #1 and #2); non-binned points (e.g., data point cloud) and average from binning (e.g., Avg TMS Bin #1 and #2).

FIG. 6 includes FIGS. 6A and 6B, where

FIG. 7 includes FIGS. 7A and 7B, where FIG. 7A is a graph of total metal recovery (%) versus %+target mesh size, and FIG. 7B is a graph of total metal recovery (%) versus %+target mesh size, showing recovery vs. production size.

FIG. 8 includes graphs of throughput (mtph) versus %+target mesh size and recovery (%), as well as net metal production (tph) versus %+target mesh size, showing a NMP objective function (top) per Equation 1.

FIG. 9 is a graph of net metal production per hour (t/h) versus %+target mesh size, showing net metal production optimized by operating at +/−1% of 20.3%+TMS.

FIG. 10 includes FIGS. 10A and 10B, where FIG. 10A shows a photograph of a PST particle sizing sensor mounted on a hydrocyclone overflow pipe, and where FIG. 10B is an illustration of the principle of operation.

FIG. 11 is a graph of CYCLONEtrac PST measurement %+100 mesh versus sampled and sieve results %+100 mesh (%+150 microns), showing a comparison of the CYCLONEtrac PST measurement with sampled and sieved data from a major copper concentrator. (Dashed lines indicate calculated one standard deviation of 2.7.)

FIG. 12 is a graph of CYCLONEtrac PST measurement %+200 mesh versus sampled and sieve results %+200 mesh (%+74 microns), showing a comparison of the CYCLONEtrac PST measurement with sampled and sieved data from a copper, gold and silver concentrator. (Dashed lines indicate calculated one standard deviation of 2.19.)

FIG. 13 shows histograms of count versus particle sizes (PST+150µ %) from 10 cyclones on a battery over a one-month period.

FIG. 14 shows a scatterplot matrix having scatterplots of particle size measurements from CYCLONETRAC PST on individual cyclones.

FIG. 15 shows a Table 1 having a correlation matrix with Pearson correlation coefficient indicating particle size correlations between cyclones on the same battery.

FIG. 16 is a graph of %+target sieve size versus time for 10 cyclones, e.g., showing a time trace of particle size measurements on different cyclones on same battery indicating static and dynamic differences.

FIG. 17 is a graph of average PST particle size (% retained by target) versus mill hydrocyclone battery pressure (bar), showing a cross plot of particle size as averaged from operating cyclones with cyclone battery pressure.

FIG. 18 is a graph of average PST particle size (% retained by target) versus mill hydrocyclone feed density (gm/cm$^2$), showing a cross plot of average cyclone overflow particle size versus cyclone battery feed density.

FIG. 19 is a graph of mill hydrocyclone battery pressure (bar) versus mill hydrocyclone feed density (gm/cm$^2$), showing cyclone pressure plotted versus cyclone feed density.

FIG. 20 includes FIGS. 20A and 20B, e.g., with example of battery level particle size control using CYCLONETRAC PST measurement, including FIG. 20A which is a diagram of a system having a PST arranged on an overflow of a cyclone for providing PST signaling containing information about the particle size in the overflow of the cyclone, a SAG mill controller for controlling a SAG mill, a ball mill controller for controlling a Ball mill, and a % solids controller for controlling the % of solids provided to the cyclone, where the SAG mill controller, the Ball mill controller and the % solids controller each receive the PST signaling Band and provide respective controller signaling, and also including a control system for implementing a proportional/integral control.

FIG. 21 is a graph of grind size (%+150 microns) versus throughput (normalized), showing the impact of using control enabled by CYCLONEtrac PST measurement versus traditional density control based upon the grind size reduction at a given throughput and a throughput increase at the given grind size using PST control, e.g., where density control data points are distributed about the density control line, and where PST control data points are distributed about the PST control line.

FIG. 22 is a diagram showing the Hogg & Furstenau Model for Mill Power Draw.

FIG. 23 includes FIGS. 23A and 23B, where FIG. 23A is a graph of % passing versus particle size (mm) showing a product curve, a feed curve and a 'Grinding Task', and where FIG. 23B is a graph of specific energy (kWh/t) versus product size, P80 (microns) showing a lower 3000 micron curve (boxes), an intermediate 6000 micron curve (triangles), an upper 9000 micron curve (circles) and the effect of relaxing it by reducing specific energy.

FIG. 24 includes a graph of individual PST signals (%+150 microns) versus time; a graph of feed flow per cyclone (gpm) versus time, a graph of battery pressure (psi) versus time; and a graph of Alim. a molino SAG (tph), e.g., showing roping cyclones that enters a roping condition when a process limit like particle size is exceeded, when the roping condition starts, and also showing non-roping cyclones.

FIG. 25 includes FIGS. 25A(1), 25A(2), 25B(1), 25B(2), where FIG. 25A(1) is a graph of throughput (t/h) versus %+target mesh size having unfiltered data; where FIG. 25A(2) is a graph of total metal recovery (%) versus %+target mesh size having unfiltered data; where FIG. 25B(1) is a graph of net metal production (t/h) versus %+target mesh size having binned data; and FIG. 25B(2) is a graph of throughput (mt/h) versus %+target mesh size having binned data.

FIG. 26 includes FIGS. 26A and 26B, where FIG. 26A is a graph of frequency (%) versus product size (%+65 #), and where FIG. 26B is a graph of % net metal production improvement versus product size (%+65 #), showing actual and potential size distribution histograms and resultant NMPs (FIG. 26A), and associated potential percent NMP improvement (FIG. 26B).

FIG. 26B is a graph of normalized net metal production improvement (%) versus normalized product size (product size/optimum product size), showing normalized product size distribution without real-time size control (FIG. 27A); normalized NMP improvement (FIG. 27B).

FIG. 28 is a block diagram of a mineral extraction system, according to some embodiments of the present invention.

DETAILED DESCRIPTION OF BEST MODE OF THE INVENTION

Figure 6A:
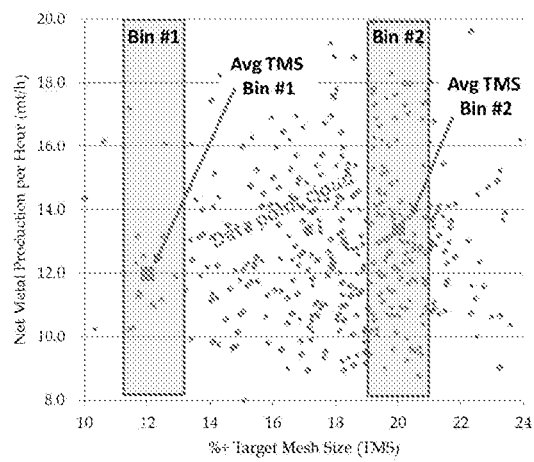
FIG. 6A is a graph of throughput (tph) versus %+target mesh size.

The present application includes three sections that set forth various techniques for controlling the operation of a mineral extraction system/process, e.g., based upon measuring a particle size in process fluid; such a slurry, using an acoustic impact-based approach, which are described in relation to that shown in FIGS. 1-28, as follows:

712-2.449 (CCS-0199): Assessing Benefits of Automatic Grinding Control Using PST Technology for True On-line Particle Size Measurement

Impact-Based Real-Time Hydrocyclone Particle Size Measurement

Principle of Operation

Acoustic impact-based particle size tracking is a unique method for measuring and controlling a reference product mesh size in cyclone overflow streams. By way of example, see the aforementioned US 2015/0362418 A1, published 17 Dec. 2015, which discloses an acoustic impact particle size measurement device that is assigned to the assignee of the present application. The implementation of this technology is centered upon a sensor probe that is inserted into the overflow slurry stream via a two-inch (50 mm) hole in the overflow pipe (FIG. 1). Particles within the slurry stream impact the surface of the probe generating travelling stress waves within the probe. A sensor converts these travelling stress waves into an electrical signal and proprietary signal processing techniques convert these signals into a particle size measurement that is output every four seconds. The sensor is constantly in contact with many particles in the slurry stream, thus obtaining information from orders of magnitude more particles than traditional sample based technologies. Also, because of the location of the sensor downstream of the hydrocyclone and the presence of an air core at that point, the sensor produces no change in the back pressure seen by the hydrocyclone and thus does not affect hydrocyclone performance. The probe has a useful life of at least 18 months due to the abrasive wear caused by the direct slurry impact. The probe life is related to the particle hardness and size which is obviously finer in the overflow stream compared to the feed stream, thus enabling an acceptable probe life. Currently, the software provides a single reference mesh size to be incorporated into process control strategy. FIGS. 1 and 2 show the main components of the PST system.

Plant Implementation of CYCLONEtrac PST Technology

The plant implementation of the PST particle sizing system includes a measurement probe with its associated electronics on each cyclone overflow pipe, a junction box that consolidates the processed signals from the individual sensors, and sends them to a computer that is typically located in the control room. Final processing takes place in that computer and the resulting particle size information is transferred to the plant system via an integrated OPC server. Currently, the software provides a single reference mesh size that is to be incorporated into the overall process control strategy. This system is outlined in FIG. 2 (See Cirulis, 2015, referenced below).

On-line impact-based PST or alternative "near-line" cyclone overflow particle size measurement methods, whether laser diffraction, ultrasonic or caliper, all require empirical calibration by correlating their signals against reference particles or actual slurry samples analyzed with standard laboratory procedures (See Wills, 2016, referenced below). The impact-based CYCLONEtrac PST also requires calibration to compensate for influences from cyclone type and sensor installation location. To ensure a good composite calibration that can be applied across all the cyclones in a cluster, calibration samples must be taken from the overflow of each cyclone in a cluster. Once such calibration takes place, it does not have to be performed again even if the probe is replaced. In addition, samples must be taken beyond the expected operating range of the cyclones to ensure accurate measurements when the cyclone is operating outside its normal operating range. Calibration ranges must cover above and below the usual operational conditions including but not limited to roping events, startups, shutdowns, and grind outs. This avoids the measurement uncertainty that occurs when calibration models are used to extrapolate measurements beyond their calibrated range. For rapid processing of samples, a single sieve size is used with a custom wet sieving procedure to generate a calibrated number such as percentage of material passing or retained by a reference sieve size, e. g. X %+100 #.

Experience shows that the resulting calibrated signals exhibit a standard deviation that is less than 4.5 percentage points from the corresponding true values. An undetermined but significant portion of this standard deviation can be attributed to the sample collection procedure. Cyclone overflows typically have limited access for sampling so a full cross-stream sample is normally difficult. Instead plunge cuts or partial cross-stream cuts are performed. As a way of example, the results from the commissioning at a phosphate concentrator is shown in FIG. 3 (See O'Keefe, 2016, referenced below).

Value Assessment Methodology

Objective

The objective of the present invention is to quantify the value of incorporating the PST on-line particle size measurement into the automatic process control system for a grinding/classification circuit using normally available historical plant data. The methodology uses daily data over a long enough time period (ideally over 1 year) to obtain a high-level assessment of the general plant operating performance, mainly focusing on throughput (T), recovery (R) and net production of the valuable metal (NMP) to be the final objective function for process optimization purposes, as determined by the simple expression:

$$NMP = hTR, \qquad (1)$$

where h represents the head grade of valuable metal being recovered.

Inherent in this methodology is the usual observation that throughput (T), recovery (R) and NMP are strongly correlated to ground product size, in such a way that there would exist in every application an optimal grind size that maximizes NMP; that is, the net value to be achieved from the operation. Therefore, better measurement and control of grind product size is here highlighted as a necessity for effective process control. Correlations of throughput and recovery to other variables such as feed grade and ore hardness must also be examined in every case, whenever the proper information is available. Finally, operational plant constraints (like, maximum tonnage or flowrates, product coarseness limitations for slurry transport, etc.) should also be taken into consideration as they may limit the maximum NMP values to be consistently obtained. This methodology is significantly simpler than others that rely on laboratory tests and sampling from an industrial circuit (See Bazin, 1994 and Edwards, 1999, referenced below).

Input Data Set

Daily operating records are to be obtained for a minimum of 6 months with one year or more preferred. The quality of all data is important, but particularly the product size data. The frequency and method of obtaining the slurry samples should be well understood, and ideally should use a modern well-designed automated sampler that obtains samples every two to 4 hours, which are then combined to produce a daily composite sample. The composite samples should be processed in a metallurgical laboratory using proper quality control to obtain the grind product size. This is typically defined by a single number, the P80, which may be readily obtained from a full particle size distribution measurement. However, for convenience, the percent passing a single mesh size is typically used, and the mesh size chosen is typically the approximate P80 size. An example of the Input Data Set and the calculated NMP is shown in FIG. 4, constructed on the basis of Equation 1 above.

Data Filtering, Analysis and Data Binning

Days with obviously faulty data are first eliminated. The primary grinding capacity indicator is the average dry tons of ore ground per actual operating hour (tph) for each day. Special attention must be given to days of low % plant utilization, since on these days the tph averages may easily be outside normal operating ranges. The objective of this data filtering method is to be left with maximum number of reliable data points.

Because most plants run at a nominal performance point, the data points for each day tend to be clustered around a central range as can be clearly seen when the data is plotted. However, this centrally weighted cloud of data makes it difficult to detect an underlying trend. Data binning is a technique for dealing with this problem because it places equal weight on each bin, rather than equal weight on each data point (See Wikipedia, 2017, referenced below). The equally weighted bins can more accurately reveal the underlying trend in the data, providing there are sufficient data points per bin across the entire range of interest. As an example of how non-binned data can give misleading results, if most of data points are concentrated in a central region where the underlying trend is mostly flat compared to the non-central regions, then the trend fitted to the non-binned data will be flat because the data points outside the central flat region will have relatively low influence and be unable to reveal the underlying trend. In this case, where we are searching for trends in throughput, recovery and NMP related to product size, the data was binned to the product size as shown in FIG. 5. It was found that equal widths of 2%+Target Mesh Size (TMS) produced the most statistically valid results.

Throughput vs Product Size

Figure 6B:
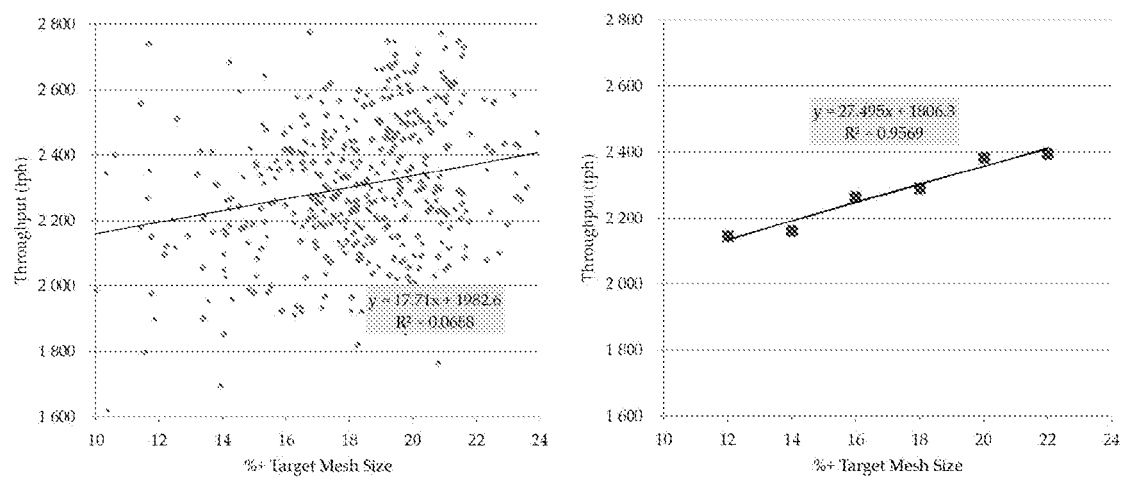
FIG. 6B is a graph of throughput (tph) versus %+target mesh size, showing throughput vs. production size with and without data binning.

The first basic correlation to examine is the relationship of ore throughput vs. product size as shown in FIG. 6, including FIGS. 6A and 6B. Typically, this relationship will show that a coarser grind size (higher %+TMS) corresponds to a higher throughput. This graph shows the grinding circuit is typically operating between 15% and 25%+TMS with a corresponding throughput increase at coarser product size.

As indicated, the bin averages shown on the right plot reveal an acceptable (high $R^2$) linear trend for the throughput vs. TMS correlation, which could not be as clearly observed in the left plot showing all data points with their natural day-to-day process variability. As described previously, the high uncertainty of fitting a regression line to the cloud of points without using data binning means that the slope of the regression line in the left graph is very unreliable as indicated by the very low $R^2$ value. However, when data binning is used in the right graph the slope can be considered reliable as indicated by the high $R^2$ value.

Recovery vs Product Size

The next basic correlation to examine is the relationship of recovery (of the target metal) to product size as shown in FIG. 7, including FIGS. 7A and 7B. Typically, the relationship will show a maximum recovery at a particular product size, with lower recovery in the finer and coarser size ranges due to losses in flotation recovery.

Again, bin averages show a clear correlation trend which is hard to identify directly from the raw data.

Net Metal Production (NMP)

Having examined the relationships of throughput and recovery vs product size, the NMP can be calculated using the data binning technique previously described, as illustrated in FIG. 8.

Net Metal Production Gain from Improved Product Size Control

Average NMP for the example operation is 13.05 tph using the current product size measurement and control strategy. If the plant were to operate at the peak of 20.3%+/−1% of TMS, the NMP would increase by 2% to 13.3 tph as illustrated in FIG. 9. Furthermore, it is well recognized that process stability relates to improved overall circuit performance (See Wysowl, 2017, referenced below). In other words, there is more gain in NMP to be achieved by reducing process variability through better product size control than has been shown in the previous analysis.

SUMMARY AND CONCLUSIONS

Availability of reliable product size measurements is key for the effective operational control of grinding/classification systems, particularly in cases where the following downstream stage is selective flotation concentration. As discussed in the present publication, PST technology is being shown to be most valuable in providing true on-line particle size information which, properly incorporated into the respective overall system control strategy, allows for the continuous maximization of the attainable process benefits.

Recognizing that product size is strongly correlated to both line throughput and valuable metal recovery, it is then possible to assess the target product size set point that will maximize at all times the objective function defined as the Net Metal Production (NMP) rate, to be expressed in tons of valuable metal produced per operating hour.

In the value assessment methodology here proposed, "data binning" techniques were found to be very useful and illustrative in the analysis of actual operational records, normally affected by fairly large normal process variations and unplanned instabilities which tend to obscure the underlying interactions amongst the most relevant process conditions.

An important advantage of the here described methodology is that it relies only on existing plant-scale data and does not involve the execution of cumbersome laboratory work.

The 2% increase in Net Metal Production predicted by this analysis, plus whatever benefits can be achieved from reducing process variability by incorporating PST technology in the control strategy, is consistent with increases previously reported from existing PST installations.

712-2.460 (CCS-0202): Grind Circuit Performance Measured and Controlled by Real-Time Particle Size Measurement on Individual Cyclones Proper control of grind circuits is essential for realizing the recovery and throughput goals of a beneficiation plant.

Currently, control is determined by the availability, accuracy, and responsiveness of key measurements. Ideally, the real-time measurement of the particle size reporting to the overflow would be used to control the particle size produced by the grind circuit. Until a few years ago, this measurement was not available in real-time with a reliability useful for control systems; therefore, insufficient surrogates, cyclone feed density or pressure or both were used. The introduction of the impact-based particle size measurement method four years ago changed the situation and the ability of the industry to control their grind circuits. The results of testing the performance of this measurement technique at ten beneficiation plants and correlation with plant conditions reveal the inadequacy of controls based on pressure or density, and the need to directly control based on particle size. The principle of operation of this sampler-free measurement technology, its implementation and measurement performance will be discussed. The control methods that are enabled by this unique system for both individual cyclone and battery level control will be shown.

Introduction

In mineral beneficiation involving grinding, mineral recovery and grade are strongly dependent on the particle size being delivered to downstream beneficiation processes. An optimal or target grind size is established based on the desired plant economics. Until recently, proper control of this target grind size has been hampered by the lack of the direct, real-time, sampler-free measurement of the particle size. This measurement problem has been solved with the implementation of real-time novel instrumentation that involves robust sensors that are mounted on the overflow pipes of individual cyclones, thus providing information on the performance of each individual cyclone as well as the entire cyclone battery or cluster.

Principle Of Operation

Consistent with that set forth above, acoustic impact-based particle size tracking is a unique method for measuring and tracking particle sizes in cyclone overflow lines. The implementation of this technology is centered upon a probe that is inserted into the slurry stream via a two-inch (50 mm) hole in the overflow pipe as seen in FIG. 10, including FIGS. 10A and 10B. Particles within the slurry stream impact the surface of the probe, generating traveling stress waves within the probe. A sensor converts these traveling stress waves into an electrical signal, and proprietary signal processing techniques translate these signals into a particle size measurement that is output every four seconds. The sensor effectively samples a few percent or more of the slurry stream, an amount that is orders of magnitude greater than what is sampled by other traditional technologies that utilize online samplers and that do not sample individual cyclones. Also, because of the location of the sensor downstream of the cyclone and the presence of an air core at that point, the sensor produces no change in the back pressure seen by the cyclone.

Implementation And Performance

The CYCLON Etrac PST system consists of a sensor probe assembly on each cyclone as seen in FIG. 2, one to two junction boxes per battery, and a control room computer. A second junction box will be required if there are more than 16 cyclones on a battery. The sensor probe assembly is made up of a hardened proprietary probe that penetrates into the overflow pipe and is in contact with the overflow stream and an integrated electronics package that is protected by a sealed metal enclosure. The sensor probe assembly is powered by 24V and communicates to a junction box using MODbus protocol. From the junction box the information is transferred to the control room computer via an Ethernet or Fiber over Ethernet line. The supplied control room computer transfers the particle size information to the plant DCS system via an OPC interface.

On-line cyclone overflow sizing methods, whether laser diffraction, ultrasonic, caliper or impact based, require calibration by correlating their signals to reference particles or to samples that are correspondingly analyzed with laboratory screens (See Outotec, 2009, referenced below). The impact-based CYCLONEtrac PST also requires calibration to compensate for influences from cyclone type, ore type, and sensor installation location. To ensure a good composite calibration that can be applied across all the cyclones in a cluster, calibration samples must be taken from the overflow of each cyclone in a cluster. Once such calibration takes place, it does not have to be performed again even if the probe is replaced. In addition, samples must be taken beyond the expected operating range of the cyclones to ensure accurate measurements when the cyclone is operating outside its normal operating range, including but not limited to roping events, start-ups, shutdowns, and grind outs. This avoids the measurement uncertainty that occurs when calibration models are used to extrapolate measurements beyond their calibrated range. For rapid processing of samples, a single sieve size is used with a custom wet sieving procedure and equipment to generate a calibrated number, such as percentage of material passing the sieve size or retained by the sieve size.

The resulting calibrated signals exhibit a standard deviation that is less than 4.5 percentage points from the ideal. An undetermined but significant portion of this standard deviation can be attributed to the sampling. This observation is due to the typical situation in which the cyclone overflows have limited access for sampling, so a full cross stream sample is difficult. Instead, plunge cuts or partial cross stream cuts are performed. Assuming a sampling and sieving error of two percentage points, the results from the commissioning at a major copper concentrator are shown in FIG. 11. In this example, the samples were sieved with a 150-micron screen. Assumed sampling error of two percentage points is shown as error bars.

An illustration of application at a grind size approximately half of the previous example is shown in FIG. 12. In this example, samples were sieved with a 74-micron screen. As in the previous example, an assumed sampling error of two percentage points is shown as error bars. The data for this example was taken on a single cyclone but with approximately the same results in terms of the standard deviation. The samples at approximately 70% retained by the 74-micron sieve were taken during roping events, demonstrating the expected increase in particle size during those events. This technology was tested at a variety of sieve sizes from 74-micron to 150-micron with a diverse range of metals, minerals and ores, including gold in quartz, metasedimentary, metavolcaniclastic rocks, and metabasalts ore; copper in porphyry ore; phosphate with silica, mica and magnetite; and iron ore with silica (O'Keefe et al 2016).

Individual Cyclone Monitoring

Cyclones within the same battery or cluster often exhibit different cut points. Both static and dynamic differences between cyclones have been noted by the present inventors. Static or quasi-static differences can be attributed to dimensional variations. An example of the differences between cyclones on the same battery over a one-month period is shown in the histogram in FIG. 13. From histograms and other analysis including differences between means while cyclones are turned on, static or quasi-static variations can be seen.

Correlations between the cyclones in a battery can be viewed via scatterplots and correlation matrix as seen in FIGS. 14 and 15. The data points from the transitions that occurred when the cyclones turned on were excluded from the scatterplots and the correlations. In this particle case some of the cyclones had good correlations with each other, particularly cyclones 1, 7 and 8 with correlations at 0.90 or greater. There were other groupings of cyclones and a few cases, such as cyclone 5, which had a poorer correlation with other cyclones, staying at 0.83 or below.

Dynamic changes in the differences between cyclones have also been noted. An example taken over a one-day period is shown in FIG. 16. Several areas are highlighted, including one where Cyclone #8, which was exhibiting similar signal levels to Cyclone #10, differs by three percentage points from Cyclone #10 for a period of 84 minutes. At the same time Cyclones #1 and #7 also drop in reported percentage of solids retained by the target sieve size. Speculation on the cause of these changes currently centers on a shift in the flow or density distribution to the cyclones.

Correlation Between Real-Time Particle Size And Grind Circuit Operating Characteristics A variety of models have been developed to calculate the overflow particle size. The cut size calculation produced by these models depends on a variety of influences, including dimensions of the cyclone vortex and apex, which can wear and change diameter, volumetric flow rate into the cyclone, volume fraction of solids being fed to the cyclone, feed size distribution, slurry viscosity, specific gravity of the solid particles, and specific gravity of the liquid phase. The validity of the models themselves is limited by the assumptions used in the first principle models and by the data sets used in the empirical models. This leaves significant uncertainty in the results; thus, a direct measurement is required. Operational parameters, such as mass flow rate into the grind circuit, density of the slurry feeding the cyclone battery, number of open cyclones, and volumetric flow rate into the cyclone battery, can be measured and adjusted. To control particle size, it is both necessary to measure the size and to have a means of controlling it. To determine whether an operational parameter can significantly influence the size, correlations between each operational parameter and the particle size are determined.

A particle sizing system was installed on a battery in a precious metals facility with a target grind size of 20% retained by the target sieve size. The particle size averaged from the operating cyclones was compared to battery pressure and battery feed density. The cross plot between the pressure and the particle size is shown in FIG. 17. The correlation is poor but trends with a positive slope, implying that the particle size increases with increasing pressure, which is contrary to the equations used to model the behavior of cyclones. The cross plot between the particle size and the cyclone battery feed density exhibits a stronger trend as seen in FIG. 18 and does follow the expected sensitivity, which exhibits an increase in particle size with increasing density. Since the influence of the pressure was contrary to the models, a cross plot of the pressure with feed density was created as seen in FIG. 19. The pressure increases with increasing feed density, which implies that the feed density has a stronger influence on particle size than pressure.

The results from this plant are typical when compared to other tests performed using the CYCLONEtrac PST to measure particle size and correlating the changes in the size to operational conditions. Cyclone feed density is the predominate driver of particle size in the cyclone overflow.

Cyclone Control Methods Enabled By CYCLONEtrac PST Measurement

Several control methods are enabled by the CYCLONETRAC PST measurement, but they can be broadly classified into two groups: 1) cyclone level control and 2) battery level control. Cyclone level control can be further subdivided into a control mode for coarse particle prevention and a control mode for sharpness increase. For coarse particle prevention, the individual cyclones are monitored in order to close a cyclone that is passing particles whose size distribution exceeds a threshold. By closing such cyclones, the battery sharpness will increase, but more importantly, the loss of recovery due to the passing of oversize particles and potential continuation into a roping condition can be prevented.

For battery level control, the CYCLONETRAC PST measurement is used by the control system to adjust operating conditions that will affect the overflow particle size. Typically, density or percent solids in the cyclone battery feed have the largest impact, thus a control system in which the difference between the measured particle size and the desired particle size is used to adjust the percent solids can be used to control the particle size. Such a system is outlined in FIG. 20.

Results Of Using CYCLONEtrac PST In Control System

By controlling particle size both by adjusting the size in order to maximize economic value and by reducing variability in the size, it is possible to increase the efficiency of the ball mill circuit. An example of the impact of using the particle size measurement to control the size is shown in FIG. 21. During the 5½ month period covered by this data set, the control mode operated under density control and under particle size control at different times. The slope and offset of the best line fits for the data under density control versus particle size control indicate that operation under particle size control on the average results in more favorable results. The square of the Pearson product moment correlation coefficient or $R^2$ is higher under particle size control versus under density control, also indicating a more favorable operating mode (See Cirulis et al., 2015, referenced below).

Conclusions

The impact-based particle sizing technology implemented in CYCLONEtrac PST has demonstrated accurate particle size measurement. Due to its real-time measurement with a four-second update, it has enabled battery level control that resulted in throughput increases for the same particle size or reduced particle sizes with the same throughput. The four-second update rate with minimal lag between the time the slurry impacts the probe and the time the measurement is reported has enabled correlations between plant battery operating conditions, such as pressure and feed density to particle size. These correlations indicate that feed density is a much stronger driver of particle size when compared to pressure. The changes in particle size at a fixed feed density indicate that the particle size cannot be controlled by holding feed density constant. Instead, particle size must be measured, and this measurement must be used to adjust feed density in order to adjust the particle size.

712-2.462 (CCS-0204): Methodology for Assessing the Benefits of Grind Control Using PST Technology for True On-Line Particle Size Measurement

Summary

As an extension of previous work set forth above, the present invention also presents the key operating criteria that permit increasing mill throughput and optimizing the production of valuable metal by identifying the optimal grind size. As this normally requires operating closer to the process physical boundaries, accurate real-time particle size measurement, such as those provided by the PST System, become essential for the practical achievement of the maximum potential value of every operation. For further illustration, data from three different copper grinding/flotation plants are shown and compared.

Background

Owners and operators of mineral ore concentrators constantly search for the most economically attractive way to increase the output of valuable metal; for example, copper. A logical approach is to identify a key parameter that has the greatest impact on the performance of multiple stages of the process, and then use a holistic analysis methodology to determine how this key parameter can be controlled to optimize the final output of these multiple stages.

Final ground product size is widely recognized as such a key parameter. However less than 10% of the mineral ore concentrators today use real-time particle size measurements for automatic control of the final product size due, to a large extent, to the inherent limitations of existing technologies, prior to the recent introduction of PST.

The "near-line" particle size measurement instrumentation that has been used for decades has typically suffered from low availability because the fundamental measurement technologies were developed for other less-demanding industries and then adapted to the harsh environment of the typical mineral concentration process.

The recently commercialized PST technology was expressly designed for true on-line measurement of the final ground product size on the overflow of each individual hydrocyclone, almost continuously, avoiding the always cumbersome challenge of taking representative slurry samples, thus overcoming several limitations of legacy technologies. Its simple acoustic-impact technology, rugged design and absence of moving parts has solved the problem of low availability, thereby making real-time measurement and automatic control of ground product size a practical reality.

To assess the potential economic benefit of implementing this PST-based measurement and control system, a methodology was developed for determining the optimum final ground product size that produces the maximum Net Metal Production (NMP) (See Maron et al., 2017, referenced below) defined as the amount of valuable net metal produced per unit time. The method uses historical daily or hourly plant data for a minimum period of one year, ideally longer. Since that initial work, data sets from two additional plants have been analysed. In all three cases the analyses have shown that although there are significant potential gains from only reducing the process variability in product size, there are additional larger potential gains obtained from coarsening the product size which enables increasing the throughput of the plant, therefore proportionally increasing the NMP. However, this must be done in a stable and controlled manner to avoid downstream problems with material handling and to prevent roping conditions with individual hydrocyclones. The PST system provides the necessary information, not previously available, to more closely approach these process barriers in a safe operational way.

The present invention provide three specific paths available to increase process performance, i.e. to maximize NMP, showing the key role of reliable ground product size measurements, including the methodology used to determine the product size that maximizes NMP.

This approach to increasing NMP focuses on the secondary grinding or ball milling for a good reason. In the 1980s and 1990s the typical bottleneck in the grinding circuits of ore concentrator plants was the SAG mill. However, significant improvements to SAG mills over the last decades have now shifted the bottleneck to the ball mills. Thus, the ball mill classification circuit is the process area where the greatest potential NMP improvement can be obtained, with significant economic benefits.

Improving Process Performance And The Key Role Of Product Size

The value analysis methodology, presented later, shows that to achieve the maximum increase in NMP—which is directly linked to net cash flow from the operation—the plant operator should increase throughput and coarsen the final product size, despite a possible decrease in recovery. The throughput equals the ratio of power to specific energy. And the well-known Bond's Law relates specific energy consumption used in size reduction to the feed and product sizes by a factor known as the Bond Work Index ($W_i$), which is a property of the ore (See Bond, 1985, referenced below). These two relationships can be combined, as shown in Equation, to show three parallel paths to increase throughput using the existing circuit, where Wi is replaced by the 'operational work index' ($W_{io}$) which is the actual energy per ton as measured in the plant. Ideally, $W_{io}$ should be less than $W_i$ for an efficient grinding operation. A detailed explanation of these paths is well known and has been presented on various occasions, including by the current inventors (See Sepulveda, 2017, referenced below), and are summarized in the following three subsections of this disclosure.

Bond's Law showing opportunities to maximizing throughput (T)

Increase mill power draw $$T = \frac{P}{E} = \frac{\overset{\text{Classification}}{\overset{\text{"Effectiveness"}}{(1/W_{io})}} \cdot \overset{\text{Input}}{P}}{\underset{\text{Grinding Task}}{10(1/P_{80}^{0.5} - 1/F_{80}^{0.5})}} \quad \text{Equation 1}$$

The first path to increase throughput as shown by Equation 1 is by increasing the power (P) drawn by the ball mill. The well-known relationship shown in FIG. 22 indicates how this can be accomplished. It follows that one should be increasing the mill charge level (J) and/or the mill speed ($N_c$) whenever possible.

Increase Classification Effectiveness

The second path to increase throughput as shown in Equation involves the operational work index ($W_{io}$) which is affected by the response of the classifiers in their closed-circuit interaction with the ball mill. The $W_{io}$ appears as a reciprocal in Equation, thus representing the "effectiveness" of the classification, i.e. how the classifiers contribute to reduce the tons processed per unit of energy consumed. A more effective operation is that where the $W_{io}$ is reduced to its minimum possible value. This means that for optimal energy efficiency and throughput of an effective grinding process, it is required that the content of fine particles in the mill charge be as low as possible for a given grinding task, thus reducing $W_{io}$. This may be achieved by operating the circuit under the following three operating conditions, which are sometimes referred to as the "Fourth Law" criterion.

Minimum % Solids Overflow, only limited by the total water availability,

Maximum % Solids Underflow, only limited by the undesirable 'roping' condition,

Maximum Circulating Load, only limited by the capacity of both the pump(s) and the mill itself to transport the required volume of slurry.

The collective goal of these three operating conditions is for the hydrocyclones to remove fine particles from the circuit as soon as they are reduced to the target size. In this way, the energy of the mill is directed to grind the coarse particles that have not yet reached the final target grind size, rather than being used to overgrind particles that have already reached the final target size and should not be present in the mill.

Relax Grinding Task

The third and most effective way to increase throughput (T) is to relax the grinding task, which in Equation 1 is represented by the denominator that contains the feed size (F80) to the ball mill section and the product size (P80) discharged through the cyclones overflow. Equation 1 shows that bringing the F80 and P80 closer together, i.e. making the feed size smaller and/or making the product size coarser, will produce increased throughput (T). A graphical representation of the grinding task, and the empirical relationship known as Bond's Law, are shown in FIG. 23, including FIG. 23A (left), where $W_{io}$ represents the effective hardness of the ore. In the NMP optimization methodology, the technique focuses on coarsening the P80, which has a greater effect on increasing throughput than reducing the F80 size, as shown in FIG. 23, including FIG. 23B (right).

However, as the P80 and throughput are increased, a reliable real-time measurement of product size like the one provided by PST becomes extremely valuable for implementing this approach while avoiding problems as downstream process limits are approached. A typical process limit is when hydrocyclones enter a so-called roping condition as their underflow discharge capacity is exceeded. FIG. 24 shows such an example of ball mill classification circuit being pushed to higher throughput and higher particle size—as measured by PST—until the point at which a hydrocyclone exceeds its operating limit and enters a roping condition. The detrimental effect on the stability and performance of all the other cyclones in the battery is clearly seen, as the battery sends a large volume of coarse material to downstream flotation. The data was obtained after the installation of a PST system but before it was used for control. The most relevant learning from this experience is that "one wrong cyclone corrupts the whole battery of cyclones".

Value Assessment Methodology

The objective of this methodology is to quantify the value of incorporating the PST on-line particle size measurement into the automatic process control system for a grinding/classification circuit using normally available historical plant data. The methodology uses daily data over a long enough time (ideally over 1 year) to obtain a high-level assessment of the general plant operating performance, mainly focusing on throughput (T), and recovery (R) which are used to calculate the net production of valuable metal (NMP)—the primary generator of cash flow—giving the final objective function for process optimization purposes, as determined by the simple expression:

NMP=hTR where h represents the head grade of valuable metal being recovered.

Equation 2: Objective function for calculating Net Metal Production (NMP)

Inherent in this methodology is the usual observation that throughput (T) and recovery (R) are a strong function of product size, thus product size is chosen as the independent variable. Therefore, NMP is also a strong function of product size, thus there should exist an optimal product size that maximizes NMP and cash flow. Therefore, accurate measurement and control of product size is here highlighted as a necessity for effective process control. Correlations of throughput and recovery to other variables such as feed grade and ore hardness must also be examined in every case, whenever the proper information is available. Finally, operational plant constraints (like, maximum tonnage or flowrates, product coarseness limitations for slurry transport, etc.) should also be taken into consideration as they may limit the maximum NMP values to be consistently obtained.

Throughput, Recovery and NMP vs Product Size

The minimum input data set consists of the following four parameters, sampled at least once daily for a minimum of one year: weight percent passing a target grind size (e.g. P80 or %+target mesh size), throughput per unit time, feed grade, percent net metal recovery. Once the data set is cleaned by filtering, the throughput (T) and Recovery (R) are plotted vs Target Grind Size as shown in FIG. 25, including FIGS. 25A(1) and 25A(2) (left), which typically show centrally weighted data clouds that make trend detection very unreliable. This is addressed by using a data binning technique that places equal weight on each product size bin, as seen by the throughput and recovery plots in FIG. 25, including FIGS. 25B(1) and 25B(2) (right).

The filtered throughput and recovery are then verified; i.e. throughput should show an increasing tendency with increasing particle size, and recovery should show a peak recovery at a unique particle size, both as predicted by basic comminution and flotation practice. NMP can now be calculated, and its maximum identified as shown in FIGS. 25B(1) and 25B(2) (right).

In general, an important conclusion that can be drawn from the data, as shown in FIG. 25 is that the maximum NMP is normally achieved by increasing throughput by coarsening the product size, usually at the expense of sacrificing some recovery. From this important conclusion comes a challenge. How to measure grind size in a continuous reliable way so that these measurements can be incorporated in the automatic control system strategy, and thus prevent violating the downstream process limitations imposed by particle size and or material handling capabilities. FIG. 26, including FIG. 26A (left), shows the actual particle size distribution without real-time particle size control, and the expected reduced variability and increased product size achievable by using real-time particle size control such as PST. FIG. 26B (right) shows the potential incremental NMP improvements by only reducing size variability at the current product size, and then coarsening the product size to a higher target size.

Comparison of Product Size Control in Three Plants

In addition to the data set analysed above, data sets from two additional SABC circuits (sag, ball mill and/or pebble crusher circuits) were analysed. To compare and benchmark the performance of plants without real-time product size control, normalized histograms of the product size distributions for the three plants are shown together in FIG. 27, including FIG. 27A (left). For better comparison, the x-axis is normalized to the average product size and the y-axis is normalized to the percent of total number of readings. The data is plotted without the filtering of data binning to reveal more of the data structure. It is interesting to observe that the natural process variability appears similar in all cases, considering that these are all large porphyry copper operations with similar grind-classification circuits that do not include particle sized-based control strategies. It is to be expected that under particle size control strategies, the variability would be significantly reduced.

Figure 27A:
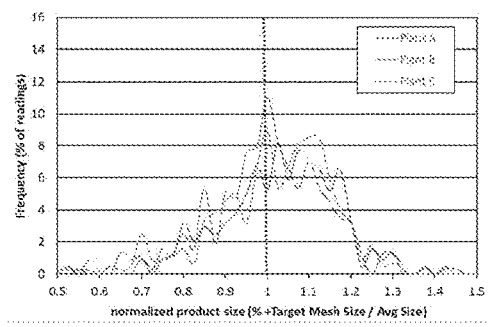
FIG. 27A is a graph of frequency (% of readings) versus normalized product size (%+target mesh size/average size), and where
Figure 27B:
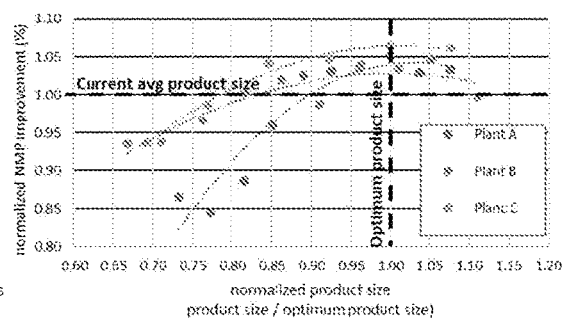
FIG. 27 includes FIGS. 27A and 27B, where

FIG. 27B (right) shows the normalized NMP improvement for the plants, indicating that the current product size is normally in the range of 80% to 90% of the optimum size to achieve maximum NMP, and the expected NMP improvements are 3% to 6% if the current average product size is increased to the optimum size.

Conclusion

Final ground particle size determines plant throughput and recovery, and thus the production of valuable metal that drives cash flow. The absence of a reliable real-time particle size measurement has for decades limited the implementation of automatic particle size control strategies that can enable mineral concentrator plants to maximize the production of valuable metal. The new highly reliable PST real-time particle size measurement technology now enables plants to implement control strategies that permit them to grind coarser, increase throughput, and optimize metal production, thus more closely approaching process limits while monitoring and controlling product size to avoid downstream problems. The present invention provides fundamental operational strategies that should be implemented to maximize valuable metal production, and a simple methodology to estimate the resulting economic benefits. Data from three plants has shown a typical variation in product size from processes without automatic control based on real-time particle size measurement. Data also shows that significant increases in valuable metal production of several percentage points are possible.

FIG. 28: The Mineral Extraction System 10

FIG. 28 shows one embodiment of the present invention in the form of a mineral extraction system 10 having at least one hydrocyclone 12, a particle size measurement device 14 and a controller 16 having a signal processor or processing module 16a.

The at least one hydrocyclone 12 each have input piping, underflow piping, a cyclone portion and overflow piping.

The particle size measurement device 14 may be arranged on some part of the at least one hydrocyclone and configured to sense particles flowing in a process medium, and providing signaling containing information about the size of the particles in the process medium.

The signal processor or processing module 16a may be configured at least to:
  receive the signaling;
  determine control signaling containing information to control some part of the mineral extraction system, based upon the signaling received; and/or
  provide the control signaling containing information to control some part of the mineral extraction system.

The signal processor or processing module 16a may be configured to implement the basic signal processing functionality according to some embodiments of the present invention.

The controller 16 may also include other circuits, components or modules 16b to implement the functionality of the signal processor or processing module 16a either now known or later developed in the future, e.g., including memory modules, input/output modules, data and busing architecture and other signal processing circuits, wiring or components, consistent with that known by a person skilled in the art, and/or consistent with that set forth herein.

Signal Processor or Signal Processing Module 16a

By way of example, and consistent with that described herein, the functionality of the signal processor or processing module 16a may be implemented to receive the signaling and/or provide the control signaling, e.g., using hardware, software, firmware, or a combination thereof, although the scope of the invention is not intended to be limited to any particular embodiment thereof. In a typical software implementation, the signal processor or processing module 16a may include, or take the form of, one or more microprocessor-based architectures having a microprocessor, a random access memory (RAM), a read only memory (ROM), input/output devices and control, data and address busing architecture connecting the same. A person skilled in the art would be able to program such a microprocessor-based implementation to perform the functionality set forth herein, as well as other functionality described herein without undue experimentation. The scope of the invention is not intended to be limited to any particular implementation using technology either now known or later developed in the future. Moreover, the scope of the invention is intended to include a signal processor, device or module 16a as either part of the aforementioned apparatus, as a stand alone module, or in the combination with other circuitry for implementing another module.

Techniques for receiving signaling in such a signal processor or processing module 16a are known in the art, and the scope of the invention is not intended to be limited to any particular type or kind thereof either now known or later developed in the future. Based on this understanding, a person skilled in the art would appreciate, understand and be able to implement and/or adapt the signal processor or processing module 16a without undue experimentation so as to receive the signaling, consistent with that set forth herein.

Moreover, techniques for determining control signaling in such a signal processor or processing module 16a are known in the art, and the scope of the invention is not intended to be limited to any particular type or kind thereof either now known or later developed in the future. Based on this understanding, a person skilled in the art would appreciate, understand and be able to implement and/or adapt the signal processor or processing module 16a without undue experimentation so as to determine and provide the control signaling for controlling some part of the mineral extraction system.

Applications

By way of example, the present invention may be used in, or form part of, or used in conjunction with, industrial processes like a mineral extraction processing system for extracting or separating minerals in a fluidic medium that are either now known or later developed in the future, including any mineral process, such as those related to processing substances or compounds that result from inorganic processes of nature and/or that are mined from the ground, as well as including either other extraction processing systems or other industrial processes, where the extraction, or separating, or sorting, or classification, of product by size, or density, or some electrical characteristic, is critical to overall industrial process performance.

REFERENCES

Bazin, C., Grant, R., Cooper, M, Tessier, R. (1994), 'Prediction of Metallurgical Performances as a Function of Fineness of Grind', Canadian Mineral Processors Annual Conference, CMP Proceedings 1964-1998, (Science Direct, viewed 3 Aug. 2017, http://www.sciencedirect.com/science/article/pii/0892687594901155).

Cirulis, D. (2015) 'Process Optimization Using Real-Time Tracking of Coarse Material in Individual Cyclone Overflow Streams', METPLANT 2015 Conference, Perth, Western Australia, Sep. 7-8, 2015, Australian Institute of Mining and Metallurgy, Perth Edwards, R., & Vien, A. Desbiens, A. (Ed.). (1999). *Application of a model based size-recovery methodology*. Canada: Canadian Inst of Mining, Metallurgy and Petroleum.

Cirulis, D., Dunford, S., Snyder, J., Bartsch, E., Rothman, P., Maron, R., Newton, D., O'Keefe, C., and Mercuri, J., (2015) 'Process optimization using real time tracking of coarse material in individual cyclone overflow streams', *Proceedings MetPlant* 2015, pp93-109 (the Australasian Institute of Mining and Metallurgy: Melbourne).

McKay, J., Ynchausti, R., Gritton, K. (2014) 'Benefit Analysis of Implemented Supervisory Control Systems', KnowledgeScape, Salt Lake City, Utah, USA. (viewed Aug. 3, 2017, https://kscapedotcom.files.wordpress.com/2014/05/benefits.pdf).

O'Keefe, C., Maron, R., Cirulis, D., Medina, J. (2016) 'Survey of Real-Time Individual Cyclone Particle Size Tracking (PST) in Multiple Concentrators', Proceedings of 5th International Congress on Automation in Mining, Automining 2016, Nov. 30-Dec. 2, 2016, Antofagasta, Chile, (Gecamin, viewed Aug. 3, 2017. See https://gecamin.com/automining/english/proceedings)

O'Keefe, C., Maron, R., Cirulis, D., Medina, J., (2016) 'Multiple Concentrator Survey of Real-Time Individual Cyclone Particle Size Tracking (PST)', *Proceedings Procemin* 2016, $12^{th}$ *International Mineral Processing Conference*, Chile.

Schwarz, S., Richardson, J. M. (2013) 'Modeling and Simulation of Mineral Processing Circuits Using JKSIM-MET and JKSIMFLOAT', SME Annual Meeting, Feb. 24-27, 2013, Denver, Colo.

Wikipedia (2017), Data Binning, viewed 3 Aug. 2017, See htits://en.wikipedia.org/wiki/Data binning.

Wills, B., Finch, J., (2016) *Mineral Processing Technology*, 8th Edition, Section 4.5, page 105, Elsevier, Ltd., UK.

Wysowl, J. (2017) 'Optimising Continuous Operations', *Newsletter No.* 33, Wysowl Pty Ltd., Queensland, Australia.

Outotec Oy (2009), Outotec Literature PSI 300 EN_150109.pdf

Bond, F. C., (1985) Testing and calculations. SME Mineral Processing Handbook. Weiss, N. L. (Ed.), Section 3A: General Aspects of Comminution, pp. 16-27.

Maron, R., O'Keefe, C., Sepulveda, J. (2017), '*Assessing the Benefits of Automatic Grinding Control Using PST Technology for True On-Line Particle Size Measurement*', PROCEMIN-GEOMET 2017, 13th International Mineral Processing Conference and $4^{th}$ International Seminar on Geometallurgy, Santiago, Chile, Oct. 4-6, 2017, Gecamin Conferences for Mining.

Sepulveda, J. E., '*Operational Guidelines for an Energy Efficient Grinding/Classification Circuit*', Pre-Seminar at PROCEMIN 2017 sponsored by Coalition for Energy Efficient Comminution (CEEC), Santiago, Chile, Oct. 4, 2017.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A mineral extraction system comprising:
    at least one hydrocyclone, each having input piping, underflow piping, a cyclone portion and overflow piping;
    an impact-based particle size measurement device having a particle size sensor mounted into and arranged on some part of the at least one hydrocyclone and configured to sense particles flowing in a process medium and impacting the particle size sensor, and providing signaling containing information about a ground product size of the particles in the process medium; and
    a controller having a signal processor configured to receive the signaling, and determine control signaling to control automatically and in real time a grinding/classification circuit of the mineral extraction system, based upon the signaling received and the ground product size of the particles sensed.

2. The mineral extraction system according to claim 1, wherein the controller is configured to provide the control signaling to control the grinding/classification circuit of the mineral extraction system.

3. The mineral extraction system according to claim 1, wherein the particle size sensor of the impact-based particle size measurement device is arranged on mounted into the overflow piping of the at least one hydrocyclone.

4. The mineral extraction system according to claim 1, wherein
    the controller comprises a % solids controller, and
    the signal processor is configured to receive the signaling and determine the control signaling containing information to control the % solids provided to the input piping of the cyclone.

5. The mineral extraction system according to claim 4, wherein the control signaling contains information to adjust water provide to the % solids.

6. The mineral extraction system according to claim 1, wherein
    the grinding/classification circuit of the mineral extraction system comprises a grinding mill configured to grind solid materials into ground particles; and
    the controller comprises a grinding mill controller, and the signal processor is configured to receive the signaling and determine the control signaling containing information to control the grinding mill.

7. The mineral extraction system according to claim 6, wherein the control signaling contains information to control a control parameter of the grinding mill, including power.

8. The mineral extraction system according to claim 6, wherein the grinding mill comprises a SAG mill or a Ball mill.

9. The mineral extraction system according to claim 1, wherein the controller is configured to operate the mineral extraction system at a target product size set point, and the signal processor is configured to adjust the target product size set point based upon the signaling received and the ground product size of the particles sensed.

10. The mineral extraction system according to claim 9, wherein the signal processor is configured to adjust the target product size set point based upon a proportional/integral control algorithm.

11. The mineral extraction system according to claim 1, wherein
the grinding/classification circuit of the mineral extraction system comprises a grinding mill configured to grind solid materials into ground particles having an average ground particle size; and
the control signaling contains information to control the grinding mill to adjust the average ground particle size of the ground particles provided to the hydrocyclone, based upon the signaling received, including adjusting a target product size set point of the mineral extraction system.

12. The mineral extraction system according to claim 1, wherein
the controller is configured to operate the mineral extraction system with a desired throughput; and
the control signaling contains information to control the desired throughput of the mineral extraction system, based upon the signaling received, including adjusting a target product size set point of the mineral extraction system.

13. The mineral extraction system according to claim 1, wherein
the controller is configured to operate the mineral extraction system with a desired mineral recovery; and
the control signaling contains information to control the desired mineral recovery of the mineral extraction system, based upon the signaling received, including adjusting a target product size set point of the mineral extraction system.

14. The mineral extraction system according to claim 1, wherein the mineral extraction system comprises
hydrocyclones having individual impact-based particle size sensors mounted into and arranged thereon, each configured to sense respective particles flowing in a respective process medium in a respective hydrocyclone, and providing respective signaling containing information about respective ground product size of the respective particles in the respective process medium; and
a particle measurement device junction box configured to receive the respective signaling and provide the respective signaling to the controller.

15. The mineral extraction system according to claim 1, wherein
the grinding/classification circuit of the mineral extraction system comprises a grind circuit configured to receive ore particles having a mass flow rate; and
the controller is configured to adjust the mass flow rate of the ore particles received by the grind circuit, based upon the signaling received, including adjusting a target product size set point of the mineral extraction system.

16. The mineral extraction system according to claim 1, wherein
the at least one hydrocyclone is configured to receive a slurry having a density; and
the controller is configured to adjust the density of the slurry received by the at least one hydrocyclone, based upon the signaling received, including adjusting a target product size set point of the mineral extraction system.

17. The mineral extraction system according to claim 1, wherein
the at least one hydrocyclone comprises a battery of hydrocyclone; and
the controller is configured to adjust the number of open hydrocyclones in the batter, based upon the signaling received, including closing one or more hydrocyclones that are passing particles whose size distribution exceeds a threshold.

18. The mineral extraction system according to claim 1, wherein
the at least one hydrocyclone comprises a battery of hydrocyclone configured to receive a slurry at a volumetric flow rate; and
the controller is configured to adjust the volumetric flow rate of the slurry, based upon the signaling received, including adjusting a set point of the mineral extraction system.

19. A method comprising:
configuring at least one hydrocyclone with input piping, underflow piping, a cyclone portion and overflow piping;
mounting into and arranging on some part of the at least one hydrocyclone a particle size sensor of a an impact-based particle size measurement device to sense particles flowing in a process medium, and providing signaling containing information about a grind product size of the particles in the process medium; and
receiving in a controller having a signal processor the signaling, and determining control signaling to control automatically and in real time a grinding/classification circuit of the mineral extraction system, based upon the signaling received and the ground product size of the particles sensed.

20. The method according to claim 19, wherein the method comprises providing from the controller the control signaling to control parts of the mineral extraction system.

21. The mineral extraction system according to claim 19, wherein the method comprises arranging the impact-based particle size measurement device on the overflow piping of the at least one hydrocyclone.

22. A controller for controlling a mineral extraction system, comprising a signal processor configured to
receive signaling containing information about a ground particle size of particles in a process medium sensed by an impact-based particle size measurement device having a particle size sensor mounted into and arranged on an overflow piping of at least one hydrocyclone forming part of the mineral extraction system and configured to sense the particles impacting the particle size sensor, and
determine control signaling to control automatically and in real time a grinding/classification circuit of the mineral extraction system, based upon the signaling received and the ground particle size of the particles sensed.

23. The mineral extraction system according to claim 1, wherein the controller is configured to determine the control signaling based upon a relationship of:
   ore throughput and the ground particle size in the mineral extraction system; or
   recover of targeted ore and the ground particle size in the mineral extraction system; or
   the ore throughput and the ground particle size and the recover of targeted ore and the ground particle size in the mineral extraction system.

\* \* \* \* \*